United States Patent
Komoto et al.

(10) Patent No.: US 10,949,983 B2
(45) Date of Patent: Mar. 16, 2021

(54) IMAGE PROCESSING APPARATUS, IMAGE PROCESSING SYSTEM, IMAGE PROCESSING METHOD, AND COMPUTER-READABLE RECORDING MEDIUM

(71) Applicants: Shotaro Komoto, Kanagawa (JP); Keiji Ohmura, Kanagawa (JP)

(72) Inventors: Shotaro Komoto, Kanagawa (JP); Keiji Ohmura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 146 days.

(21) Appl. No.: 16/062,468

(22) PCT Filed: Nov. 24, 2016

(86) PCT No.: PCT/JP2016/084843
§ 371 (c)(1),
(2) Date: Jun. 14, 2018

(87) PCT Pub. No.: WO2017/104372
PCT Pub. Date: Jun. 22, 2017

(65) Prior Publication Data
US 2018/0374221 A1 Dec. 27, 2018

(30) Foreign Application Priority Data
Dec. 18, 2015 (JP) .............................. JP2015-247763

(51) Int. Cl.
*G06K 9/00* (2006.01)
*G06T 7/246* (2017.01)
(Continued)

(52) U.S. Cl.
CPC ................ *G06T 7/251* (2017.01); *G06T 7/00* (2013.01); *G06T 7/20* (2013.01); *H04N 5/76* (2013.01);
(Continued)

(58) Field of Classification Search
CPC ........... G06T 7/251; G06T 2207/10016; G06T 2207/30232; G06T 7/00; G06T 7/20;
(Continued)

(56) References Cited

U.S. PATENT DOCUMENTS 5,999,877 A * 12/1999 Takahashi .......... G06K 9/00785
701/117
6,795,068 B1 9/2004 Marks
(Continued)

FOREIGN PATENT DOCUMENTS

EP 1 176 559 A2 1/2002
JP 2005-236374 A 9/2005
(Continued)

OTHER PUBLICATIONS

International Search Report dated Feb. 14, 2017 in PCT/JP2016/084643 filed on Nov. 24, 2016.
(Continued)

*Primary Examiner* — Tom Y Lu
(74) *Attorney, Agent, or Firm* — Oblon, McClelland, Maier & Neustadt, L.L.P.

(57) ABSTRACT

An apparatus includes a reproducing unit configured to reproduce and display video data captured by an imaging apparatus in a predetermined display area on a display device; a feature area detecting unit configured to detect a plurality of feature areas based on feature information that is registered in advance for a tracking target, in a first frame of the video data displayed by the reproducing unit; and a tracking area detecting unit configured to detect an area including the plurality of feature areas as a tracking area that includes the tracking target, based on a distance between the plurality of feature areas detected by the feature area detecting unit.

16 Claims, 18 Drawing Sheets

(51) Int. Cl.
  *H04N 5/76* (2006.01)
  *H04N 7/18* (2006.01)
  *H04N 21/44* (2011.01)
  *G06T 7/00* (2017.01)
  *G06T 7/20* (2017.01)

(52) U.S. Cl.
  CPC ............... *H04N 7/18* (2013.01); *H04N 21/44* (2013.01); *G06T 2207/10016* (2013.01); *G06T 2207/10024* (2013.01); *G06T 2207/30232* (2013.01)

(58) Field of Classification Search
  CPC .......... G06T 2207/10024; H04N 21/44; H04N 5/76; H04N 7/18
  See application file for complete search history.

(56) References Cited

U.S. PATENT DOCUMENTS

| | | | |
|---|---|---|---|
| 2004/0054473 A1* | 3/2004 | Shimomura | G06T 7/248 701/301 |
| 2005/0024379 A1 | 2/2005 | Marks | |
| 2005/0026689 A1 | 2/2005 | Marks | |
| 2006/0238549 A1 | 10/2006 | Marks | |
| 2008/0111789 A1 | 5/2008 | Young et al. | |
| 2008/0187172 A1 | 8/2008 | Otsu et al. | |
| 2010/0322476 A1* | 12/2010 | Kanhere | G08G 1/0175 382/103 |
| 2011/0150277 A1 | 6/2011 | Ishii | |
| 2013/0094711 A1 | 4/2013 | Ishii | |
| 2014/0348383 A1 | 11/2014 | Kamiya | |
| 2016/0034784 A1 | 2/2016 | Ohmura et al. | |
| 2017/0178382 A1* | 6/2017 | Levin | G06K 9/4652 |

FOREIGN PATENT DOCUMENTS

| | | |
|---|---|---|
| JP | 2005-309740 | 11/2005 |
| JP | 2005-309746 | 11/2005 |
| JP | 2005-349176 A | 12/2005 |
| JP | 2006-163452 | 6/2006 |
| JP | 2008-77424 A | 4/2008 |
| JP | 2010-039617 | 2/2010 |
| JP | 2011-134020 | 7/2011 |
| JP | 2011-192092 A | 9/2011 |
| JP | 2011-254289 | 12/2011 |
| JP | 2013-085089 | 5/2013 |
| JP | 2013-201784 | 10/2013 |
| JP | 2014-229010 | 12/2014 |
| JP | 2015-179984 A | 10/2015 |
| JP | 2016-042308 | 3/2016 |

OTHER PUBLICATIONS

Extended European Search Report dated Oct. 8, 2018 in Patent Application No. 16875356.4, 8 pages.
David Claus, et al. "Reliable Fiducial Detection in Natural Scenes" Computer Vision—ECCV, XP019005941, Apr. 16, 2004, pp. 469-480.
Office Action dated Dec. 10, 2019 in corresponding Japanese Patent Application No. 2017-555950 (with English Translation), 8 pages.
European Search Report dated Dec. 3, 2020, in European Patent Application No. 16875356.4, 11 pages.
Henri Bouma, et al., "Real-time Tracking and Fast Retrieval of Persons in Multiple Surveillance Cameras of a Shopping Mall", Proc. of SPIE vol. 8756 87560A, 13 pages. May 29, 2013.

* cited by examiner

FIG.15

| FRAME NUMBER | ELAPSED TIME [s] | CENTER COORDINATES |
|---|---|---|
| 0 | 0.00 | (56, 48) |
| 1 | 0.04 | (77, 45) |
| 2 | 0.08 | (75, 47) |
| 3 | 0.12 | (50, 45) |
| 4 | 0.16 | (72, 40) |
| 5 | 0.20 | (86, 32) |
| 6 | 0.24 | (82, 40) |
| 7 | 0.28 | (45, 40) |
| 8 | 0.32 | (40, 40) |
| 9 | 0.36 | (42, 45) |
| 10 | 0.40 | (45, 40) |
| 11 | 0.44 | (50, 35) |
| 12 | 0.48 | (43, 25) |
| 13 | 0.52 | (85, 28) |

IMAGE PROCESSING APPARATUS, IMAGE PROCESSING SYSTEM, IMAGE PROCESSING METHOD, AND COMPUTER-READABLE RECORDING MEDIUM

FIELD

The present invention relates to an image processing apparatus, an image processing system, an image processing method, and a program computer-readable recording medium.

BACKGROUND

In recent years, an image processing technology for analyzing video data recorded and obtained by an imaging apparatus, such as a video camera, and detecting an object or tracking movement of an object in video is developing significantly. As an image processing method for detecting or tracking an object, various methods are known, such as background subtraction, frame subtraction, particle filters, optical flow, mean shift method, template matching, and feature matching.

As a technology for tracking a target object, a technology has been disclosed, in which a feature area of a target object is tracked with accuracy by combining a means for tracking a feature point of the target object and a means for rediscovery using a histogram (see Patent Literature 1).

CITATION LIST

Patent Literature

Patent Literature 1: Japanese Patent Application Laid-open No. 2005-309746

SUMMARY

Technical Problem

However, the technology described in Patent Literature 1 has a problem in that when an area similar to the feature area of the target object is present in the periphery, the similar area may be erroneously detected.

The present invention has been conceived in view of the foregoing situations, and an object is to provide an image processing apparatus, an image processing system, an image processing method, and a program capable of tracking only a specific tracking target with accuracy.

Solution to Problem

In order to solve the problem mentioned above and accomplish the object, the present invention includes: a reproducing unit configured to reproduce and display video data captured by an imaging apparatus in a predetermined display area on a display device; a feature area detecting unit configured to detect a plurality of feature areas based on feature information that is registered in advance for a tracking target, in a first frame of the video data displayed by the reproducing unit; and a tracking area detecting unit configured to detect an area including the plurality of feature areas as a tracking area that includes the tracking target, based on a distance between the plurality of feature areas detected by the feature area detecting unit.

Advantageous Effects of Invention

According to the present invention, it is possible to track only a specific tracking target with accuracy.

BRIEF DESCRIPTION OF DRAWINGS

FIG. 15 is a diagram illustrating an example of a tracking result table indicating information on a tracking area that is detected through the tracking process performed by the information processing apparatus according to the embodiment.

DESCRIPTION OF EMBODIMENTS

Embodiments of an image processing apparatus, an image processing system, an image processing method, and a computer-readable recording medium according to the present invention will be described below with reference to the drawings. The present invention is not limited by the embodiments below, and components in the embodiments described below include one that can easily be thought of by a person skilled in the art, one that is practically identical, and one that is within an equivalent range. Further, within the scope not departing from the gist of the following embodiments, various omission, replacement, and modifications of the components may be made.

(Overall Configuration of Image Processing System)

Figure 1:
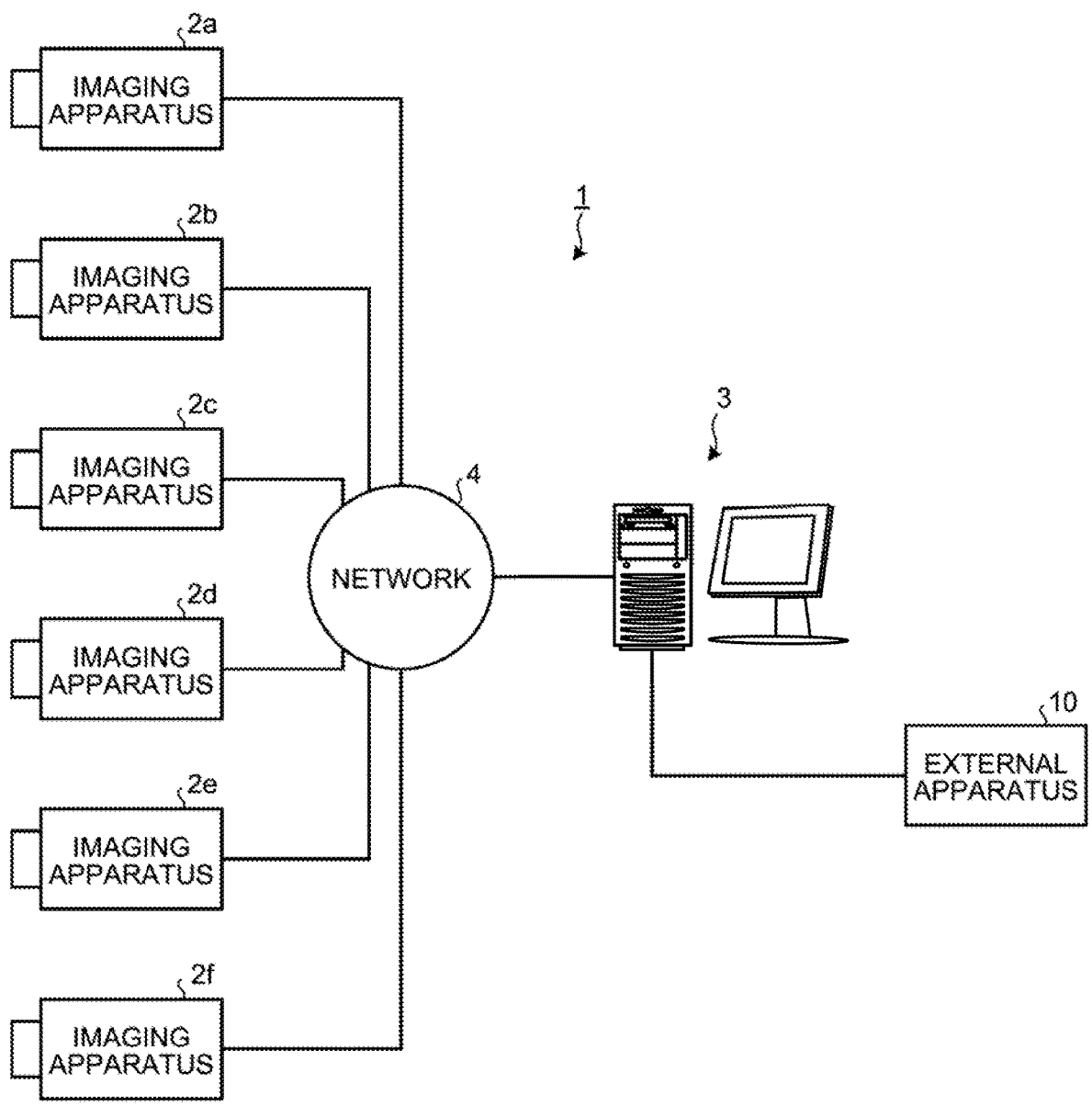
FIG. 1 is a diagram illustrating an example of an overall configuration of an image processing system according to an embodiment.

FIG. 1 is a diagram illustrating an example of an overall configuration of an image processing system according to the embodiment. With reference to FIG. 1, an overall configuration of an image processing system 1 according to the present embodiment will be described.

As illustrated in FIG. 1, the image processing system 1 according to the present embodiment includes imaging apparatuses 2a to 2f, an information processing apparatus 3, and a network 4.

The imaging apparatuses 2a to 2f are video cameras that image (capture) an object by converting light from the object to an electrical signal, and generate video data that is a moving image configured with a plurality of frames (image data) (for example, 10 (fps), 25 (fps), or the like). For example, the imaging apparatuses 2a to 2f image a worker who works in, for example, a production facility or a production line for producing a product, and generate video data.

When the imaging apparatuses 2a to 2f are referred to without distinction or referred to collectively, they are simply referred to as "imaging apparatuses 2". In FIG. 1, the image processing system 1 includes the six imaging apparatuses 2, but the embodiments are not limited to this example, and it may be possible to include a different number of imaging apparatuses 2.

The information processing apparatus 3 is a personal computer (PC), a workstation, or the like that functions as an image processing apparatus configured to perform image processing based on the video data captured by the imaging apparatus 2. Further, the information processing apparatus 3 is connected to an external apparatus 10, such as production equipment, such that they can perform communication with the external apparatus 10 based on the fieldbus standard, for example.

The network 4 is a network based on, for example, the Ethernet (registered trademark) standard for connecting the imaging apparatuses 2a to 2f and the information processing apparatus 3. In this case, in the network 4, data communication is performed using a protocol, such as a transmission control protocol/Internet protocol (TCP/IP). Further, in this case, the imaging apparatuses 2a to 2f and the information processing apparatus 3 have media access control (MAC) addresses for performing communication using a protocol, such as TCP/IP, and are assigned with IP addresses, such as private IP addresses. Furthermore, as a detailed configuration of the network 4, a star-wired topology may be employed, in which each of the imaging apparatuses 2a to 2f and the information processing apparatus 3 is connected to a switching hub having a plurality of ports via a local area network (LAN) cable, for example.

While an example is described in which the network 4 illustrated in FIG. 1 enables communication using TCP/IP, but the embodiments are not limited to this example. For example, it may be possible to employ a mode in which a video graphics array (VGA) terminals or universal serial bus (USB) ports are provided on the information processing apparatus 3 and the plurality of imaging apparatuses 2 are connected to the information processing apparatus 3 via VGA cables or USB cables, for example.

(Hardware Configuration of Information Processing Apparatus)

Figure 2:
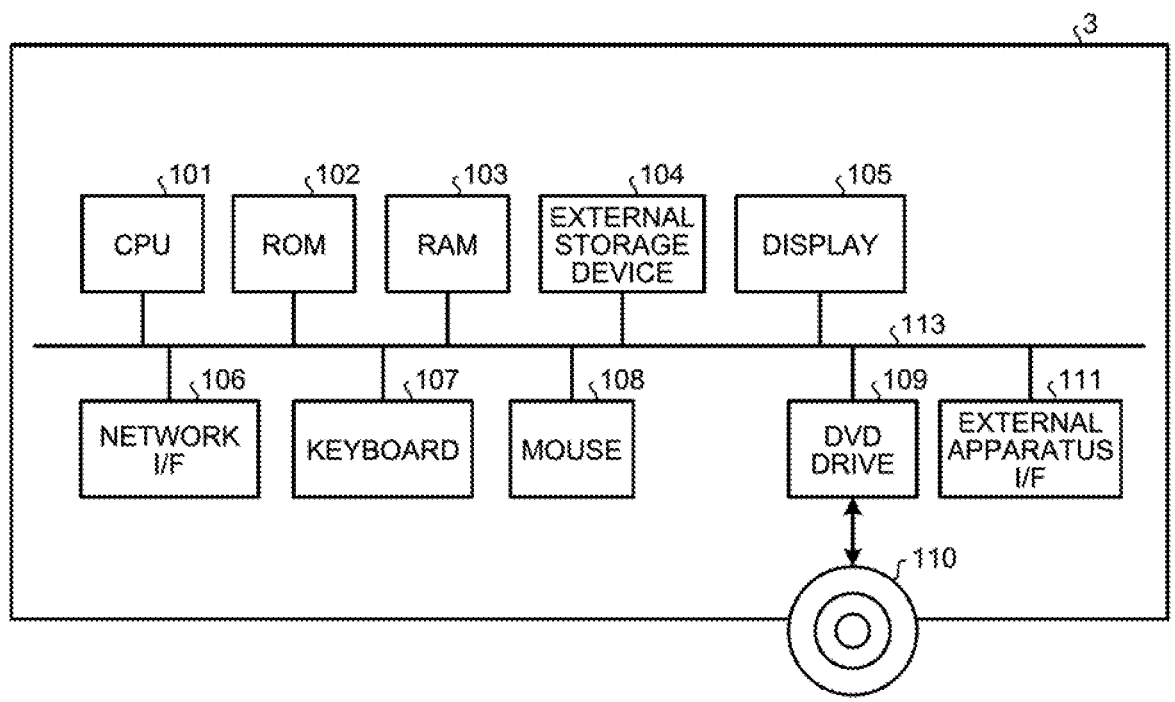
FIG. 2 is a diagram illustrating an example of a hardware configuration of an information processing apparatus according to the embodiment.

FIG. 2 is a diagram illustrating an example of a hardware configuration of the information processing apparatus according to the embodiment. With reference to FIG. 2, a hardware configuration of the information processing apparatus 3 according to the present embodiment will be described.

As illustrated in FIG. 2, the information processing apparatus 3 includes a central processing unit (CPU) 101, a read only memory (ROM) 102, a random access memory (RAM) 103, an external storage device 104, a display 105, a network I/F 106, a keyboard 107, a mouse 108, a digital versatile disc (DVD) drive 109, and an external apparatus I/F 111.

The CPU 101 is a device that controls whole operation of the information processing apparatus 3. The ROM 102 is a non-volatile storage device that stores therein a program, such as basic input/output system (BIOS) or firmware, for the information processing apparatus 3. The RAM 103 is a volatile storage device used as a work area of the CPU 101.

The external storage device 104 is a storage device, such as a hard disk drive (HDD) or a solid state drive (SSD), for storing video data captured by the imaging apparatus 2 and various kinds of data, such as setting information.

The display 105 is a display device that displays a cursor, a menu, a window, various kinds of information, such as a character or an image, or a screen of an application for executing image determination operation performed by the information processing apparatus 3. The display 105 is, for example, a cathode ray tube (CRT) display, a liquid crystal display (LCD), an organic electro luminescence (EL) display, or the like. The display 105 is connected to a main body of the information processing apparatus 3 by, for example, a VGA cable, a high-definition multimedia interface (HDMI: registered trademark) cable, an Ethernet cable, or the like.

The network I/F 106 is an interface for connecting to and performing data communication with the network 4. The network I/F 106 is, for example, a network interface card (NIC) that enables communication using a protocol of TCP/IP. Specifically, the information processing apparatus 3 acquires video data from the imaging apparatus 2 via the network 4 and the network I/F 106.

The keyboard 107 is an input device for selecting a character, a numeral, and various instructions, moving a cursor, and performing setting of setting information, for example. The mouse 108 is an input device for selecting and executing various instructions, selecting a processing target, moving a cursor, and performing setting of setting information, for example.

The DVD drive 109 is a device that controls read, write, and deletion of data with respect to a DVD 110 that is one example of a removable storage medium.

The external apparatus I/F 111 is an interface for connecting to and performing data communication with the external apparatus 10. The external apparatus I/F 111 is, for example, an interface card that enables communication based on the fieldbus standard. Specifically, the information processing apparatus 3 performs data communication with the external apparatus 10 via the external apparatus I/F 111.

The CPU 101, the ROM 102, the RAM 103, the external storage device 104, the display 105, the network I/F 106, the keyboard 107, the mouse 108, the DVD drive 109, and the external apparatus I/F 111 are communicably connected to one another via a bus 113, such as an address bus or a data bus. When the display 105 is connected using an Ethernet cable, the display 105 is connected to the network I/F 106, and, in this case, data communication using a protocol, such as TCP/IP, is performed.

(Block Configuration of Information Processing Apparatus)

Figure 3:
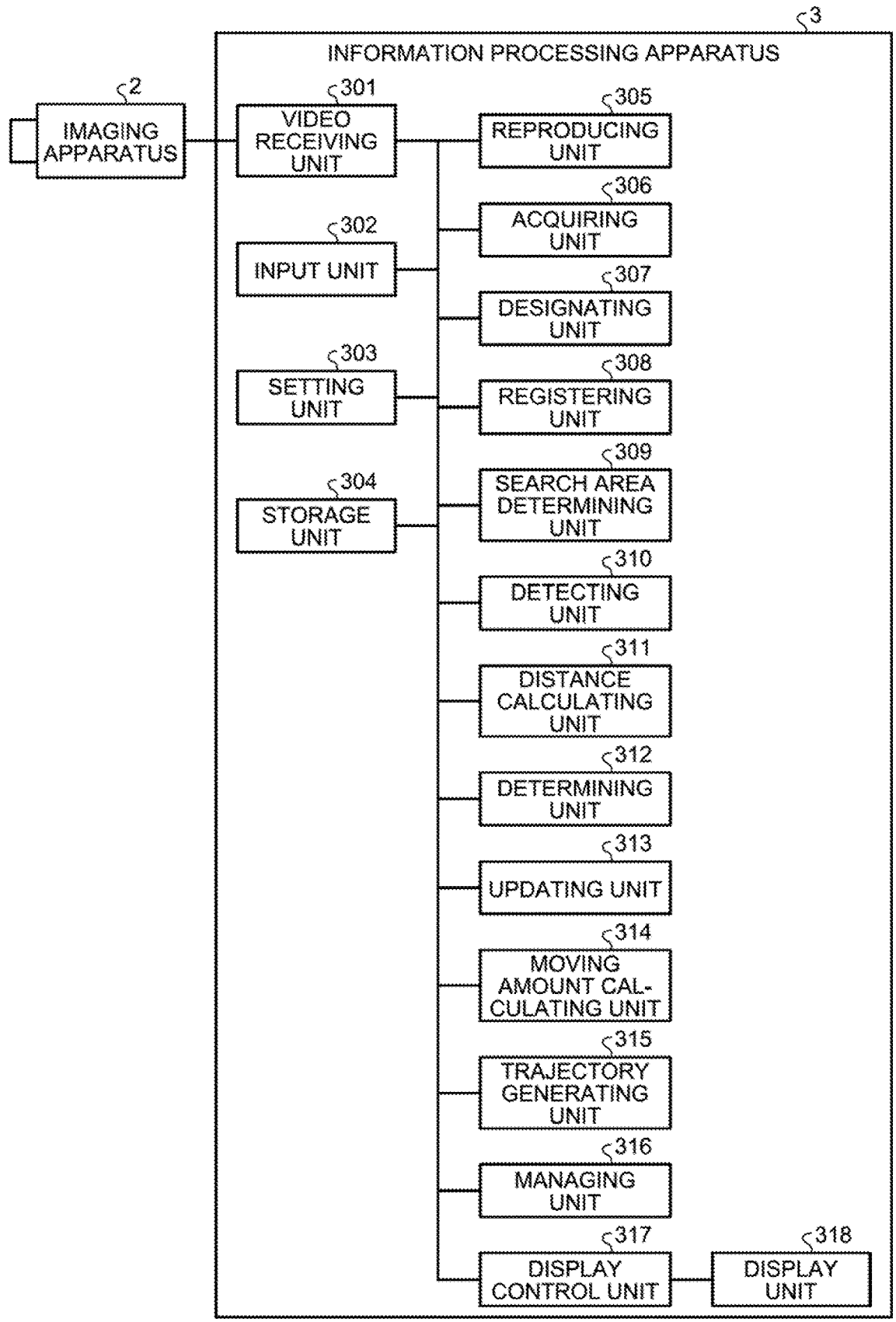
FIG. 3 is a diagram illustrating an example of a functional block configuration of the information processing apparatus according to the embodiment.

FIG. 3 is a diagram illustrating an example of a functional block configuration of the information processing apparatus according to the embodiment. With reference to FIG. 3, a block configuration of the information processing apparatus 3 will be described.

As illustrated in FIG. 3, the information processing apparatus 3 includes a video receiving unit 301, an input unit 302, a setting unit 303, a storage unit 304, a reproducing unit 305, an acquiring unit 306, a designating unit 307, a registering unit 308, a search area determining unit 309 (determining unit), a detecting unit 310 (feature area detecting unit), a distance calculating unit 311 (calculating unit), a determining unit 312, an updating unit 313 (tracking area detecting unit), a moving amount calculating unit 314, a trajectory generating unit 315 (generating unit), a managing unit 316, a display control unit 317, and a display unit 318 (display device). In FIG. 3, the network 4 is not illustrated for simplicity of explanation.

The video receiving unit 301 is a functional unit that receives video data from the imaging apparatus 2 via the network 4. The video receiving unit 301 stores the received video data in the storage unit 304. The video receiving unit 301 is realized by the network I/F 106 illustrated in FIG. 2.

The input unit 302 is a device that inputs operation for causing the information processing apparatus 3 to perform a color registration process, a tracking process on a tracking target, and the like. The input unit 302 is realized by the keyboard 107 and the mouse 108 illustrated in FIG. 2.

The setting unit 303 is a functional unit that sets various kinds of setting information and stores the setting information in the storage unit 304 in accordance with an operation signal given from the input unit 302 operated by a user. For example, the setting unit 303 sets information (hereinafter, may be referred to as a "tracking parameter") indicating a predetermined range centered at the reference color that is registered in the registering unit 308 as will be described later, and stores the set tracking parameter in the storage unit 304. Here, the predetermined range centered at the reference color is determined such that when the reference color is represented in the RGB color space, a predetermined range centered at an R value of the reference color is determined by setting an upper limit value, which is obtained by adding a predetermined amount to the R value of the reference color, and a lower limit value, which is obtained by subtracting the predetermined amount from the R value. The same applies to a G value and a B value of the reference color. The predetermined amount may be set to a different value for each of the R value, the G value, and the B value. The setting unit 303 is realized by a program executed by the CPU 101 illustrated in FIG. 2.

The storage unit 304 is a functional unit that stores therein video data received by the video receiving unit 301, various kinds of setting information, and the like. The storage unit 304 stores therein the video data received by the video receiving unit 301 such that the imaging apparatus 2 that has generated the video data can be identified. The storage unit 304 is realized by, for example, the RAM 103 or the external storage device 104 illustrated in FIG. 2. It is assumed that the storage unit 304 is included in the information processing apparatus 3 as illustrated in FIG. 3, but the embodiments are not limited to this example. For example, the storage unit 304 may be an external storage device attached from outside, or may be provided in an external apparatus, such as a server device.

Figure 5:
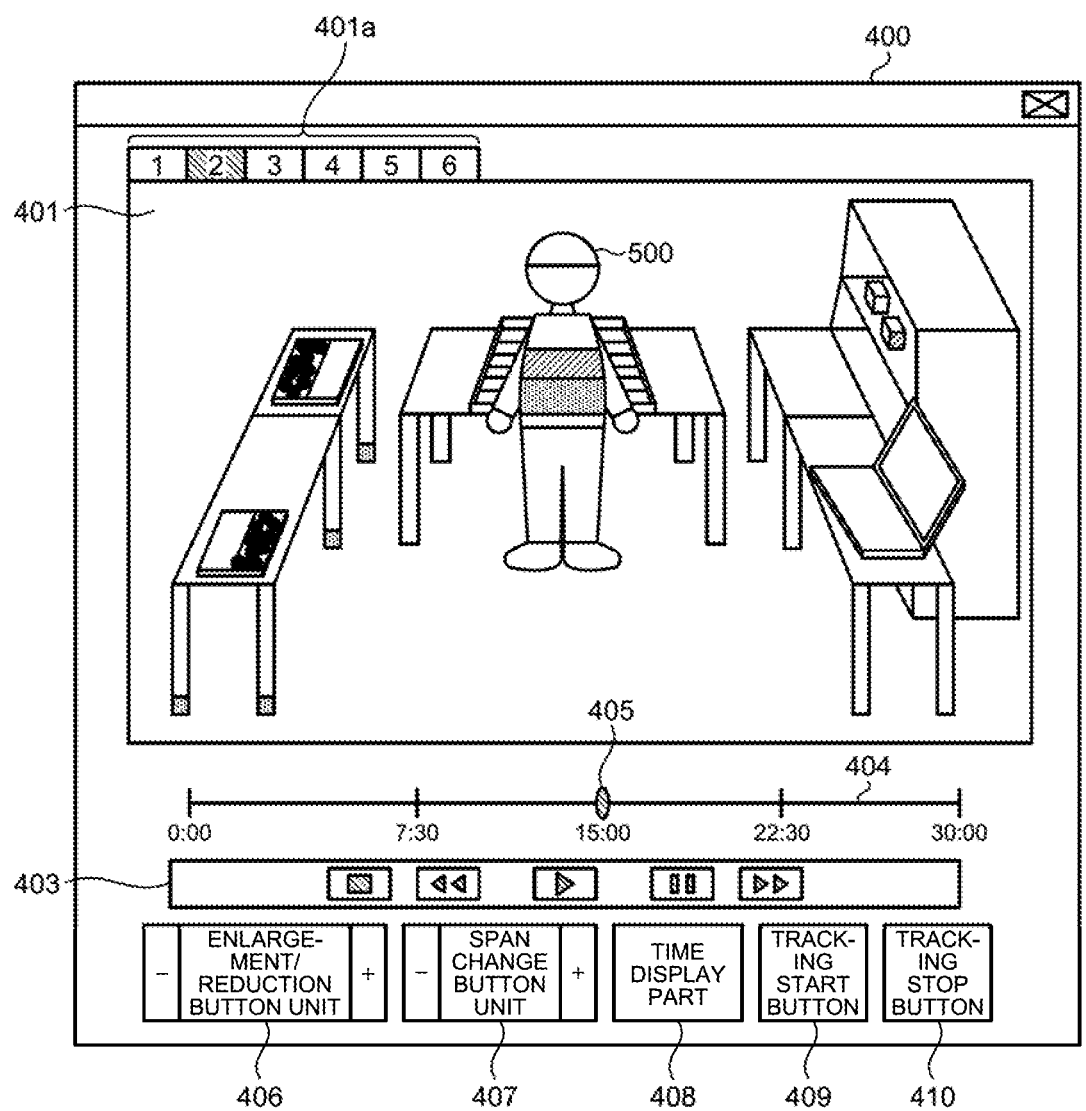
FIG. 5 is a diagram illustrating an example of a state in which video is displayed on a tracking screen that is displayed on a display unit of the information processing apparatus according to the embodiment.

The reproducing unit 305 is a functional unit that sends the video data acquired from the storage unit 304 to the display control unit 317 and causes the display control unit 317 to reproduce and display the video data on the display unit 318 in accordance with an operation signal given from the input unit 302 operated by the user. Specifically, as illustrated in FIG. 5 to be described later, the reproducing unit 305 displays video data on a video display part 401 of a tracking screen 400 displayed on the display unit 318. The reproducing unit 305 is realized by a program executed by the CPU 101 illustrated in FIG. 2.

The acquiring unit 306 is a functional unit that acquires a frame, which is to be subjected to a tracking process on a tracking target, from the video data stored in the storage unit 304. The acquiring unit 306 is realized by a program executed by the CPU 101 illustrated in FIG. 2.

The designating unit 307 is a functional unit that designates a designation area (for example, a first designation area 550 and a second designation area 551 illustrated in FIG. 6 to be described later), which is for identifying a color serving as feature data (feature information) to be used in the tracking process on the tracking target, in a display area (the video display part 401 in FIG. 5 to be described later) that displays the video data on the display unit 318, in accordance with an operation signal given from the input unit 302 operated by the user. The designating unit 307 stores information on the designated designation area in the storage unit 304 in association with each of the imaging apparatuses 2. The designating unit 307 is realized by a program executed by the CPU 101 illustrated in FIG. 2.

The registering unit 308 is a functional unit that identifies a color of the designation area as a reference color based on a pixel value of the designation area designated by the designating unit 307, and stores (registers) information on the identified reference color in the storage unit 304. The registering unit 308 identifies two reference colors based on two designation areas (for example, the first designation area 550 and the second designation area 551 illustrated in FIG. 6 to be described later) that are designated by the designating unit 307. Here, a pixel value of a frame of the video data displayed in the video display part 401 is, for example, information indicating a color based on the RGB color space, the HSV color space, or the like. Specifically, the registering unit 308 calculates an average value of pixel values of pixels included in the designation area, and specifies the average value as the reference color, for example. The registering unit 308 may identify a pixel value of a central pixel of the designation area as the reference color. The registering unit 308 is realized by a program executed by the CPU 101 illustrated in FIG. 2.

The search area determining unit 309 is a functional unit that determines a search area, in which the detecting unit 310 detects a feature area having the color registered by the registering unit 308, in a frame to be subjected to the tracking process on the tracking target. For example, if the detecting unit 310 does not detect a feature area in a specific frame, the search area determining unit 309 extends a search area by a predetermined amount relative to the search area in the specific frame, and determines the extended search area as a search area for a frame next to the specific frame. The search area determining unit 309 is realized by a program executed by the CPU 101 illustrated in FIG. 2.

The detecting unit 310 is a functional unit that detects feature areas using the two reference colors within the search area determined by the search area determining unit 309 in the frame to be subjected to the tracking process on the tracking target. Specifically, the detecting unit 310 performs processes, such as an extraction process, a binarization process, and a labelling process, which are to be described later, on the frame to be subjected to the tracking process on the tracking target, and detects, as the feature areas, areas corresponding to blocks including pixels with colors that are included in predetermined areas (hereinafter, may be referred to as "reference color areas") that are centered at the reference colors as described above. The operation of detecting the feature areas performed by the detecting unit 310 will be described later with reference to FIGS. 7 to 13. The detecting unit 310 is realized by a program executed by the CPU 101 illustrated in FIG. 2.

The distance calculating unit 311 is a functional unit that calculates a distance between the two feature areas detected by the detecting unit 310. Specifically, the distance calculating unit 311 calculates a distance between most adjacent pixels among pixels included in each of the two feature areas. The distance calculating unit 311 is realized by a program executed by the CPU 101 illustrated in FIG. 2.

The determining unit 312 is a functional unit that determines whether the two feature areas detected by the detecting unit 310 are located adjacent to each other. Specifically, the determining unit 312 determines whether the distance between the two feature areas calculated by the distance calculating unit 311 is equal to or smaller than a predetermined threshold. The determining unit 312 is realized by a program executed by the CPU 101 illustrated in FIG. 2.

The updating unit 313 is a functional unit that, when the determining unit 312 determines that the distance between the two feature areas is equal to or smaller than the predetermined threshold, detects an area including the two feature areas as a tracking area. That is, the updating unit 313 updates a tracking area with the detected tracking area as an area including a current tracking target. Further, the updating unit 313 stores, in the storage unit 304, information on the detected tracking area in association with the detected frame. Here, the information on the tracking area includes information on the coordinates of a center point of the tracking area, information on a size of the tracking area, and the like, for example. The updating unit 313 is realized by a program executed by the CPU 101 illustrated in FIG. 2.

The moving amount calculating unit 314 is a functional unit that calculates a moving amount of the tracking target. Specifically, the moving amount calculating unit 314 calculates a moving amount of the center point of the tracking area among pieces of the information on the tracking area corresponding to each of the frames of the video data stored in the storage unit 304. The moving amount of the center point of the tracking area is obtained as a sum of moving amounts of the center point of the tracking area among all of the frames as indicated by Equation (1) below.

$$d = \sum_{i=0}^{n-1} \sqrt{(x_{i+1} - x_i)^2 + (y_{i+1} - y_i)^2} \qquad (1)$$

In Equation (1), d is a moving amount of the center point of the tracking area, i is a frame number, xi is an x-coordinate (a coordinate in the horizontal axis of the frame) of the center point of the tracking area in a frame with the frame number i, and yi is a y-coordinate (a coordinate in the vertical axis of the frame) of the center point of the tracking area in the frame with the frame number i. Therefore, the moving amount calculating unit 314 can calculate the moving amount of the center point of the tracking area from a frame with the frame number 0 to a frame with the frame number n using Equation (1). The moving amount calculating unit 314 is realized by a program executed by the CPU 101 illustrated in FIG. 2. The moving amount calculating unit 314 can more accurately calculate the moving amount by using pieces of video data that are captured by the plurality of imaging apparatuses 2 and stored in the storage unit 304 in a synchronized manner. For example, it is possible to further calculate a moving amount in a depth direction by separately using video data captured in the depth direction (z-axis direction).

The trajectory generating unit 315 is a functional unit that generates a trajectory line indicating a trajectory of the tracking target, and causes the display control unit 317 to display the trajectory line in a superimposed manner on video data that is reproduced and displayed on the video display part 401. Specifically, the trajectory generating unit 315 connects the center point of the tracking area detected in a certain frame and the center point of the tracking area detected in a next frame with a line among frames of the video data read from the storage unit 304, and displays the line as the trajectory line in a superimposed manner on the video data. The trajectory generating unit 315 may generate the trajectory line by connecting any point (pixel) included in at least the tracking area, instead of the center point of the tracking area. The trajectory generating unit 315 is realized by a program executed by the CPU 101 illustrated in FIG. 2.

The managing unit 316 is a functional unit that starts or stops the tracking process on the tracking target that is identified by the reference color registered by the registering unit 308 with respect to the video data displayed on the video display part 401, in accordance with an operation signal given from the input unit 302 operated by the user. Further, the managing unit 316 manages whole operation of the information processing apparatus 3. The managing unit 316 is realized by a program executed by the CPU 101 illustrated in FIG. 2.

The display control unit 317 is a functional unit that controls display operation of the display unit 318. Specifically, the display control unit 317 displays the video data acquired by the reproducing unit 305, the setting information set by the setting unit 303, the designation area designated by the designating unit 307, and the like on the display unit 318. The display control unit 317 is realized by a program (driver) executed by the CPU 101 illustrated in FIG. 2.

The display unit 318 is a device that displays various kinds of data under the control of the display control unit 317. In particular, in the present embodiment, the display unit 318 displays the tracking screen 400 (to be described later) or the like based on a program (application) executed by the CPU 101 illustrated in FIG. 2. The display unit 318 is realized by the display 105 illustrated in FIG. 2.

A part or all of the video receiving unit 301, the input unit 302, the setting unit 303, the storage unit 304, the reproducing unit 305, the acquiring unit 306, the designating unit 307, the registering unit 308, the search area determining unit 309, the detecting unit 310, the distance calculating unit 311, the determining unit 312, the updating unit 313, the moving amount calculating unit 314, the trajectory generating unit 315, the managing unit 316, the display control unit 317, and the display unit 318 illustrated in FIG. 3 may be realized by a hardware circuit, such as an application specific integrated circuit (ASIC) or a field-programmable gate array (FPGA), instead of a program that is software.

Further, each of the functional units illustrated in FIG. 3 is functionally conceptual, and need not necessarily be configured in the same manner. For example, a plurality of functional units illustrated as independent functional units in FIG. 3 may be configured as a single functional unit. In contrast, a function of a single functional unit in FIG. 3 may be divided into a plurality of functions and configured as a plurality of functional units.

Furthermore, to simplify explanation given below, an expression describing that the display control unit 317 displays the received data on the display unit 318 will be simply described such that a functional unit that has sent the data to the display control unit 317 displays the data on the display unit 318 (or a screen displayed on the display unit 318). For example, when the reproducing unit 305 sends video data to the display control unit 317 and causes the display control unit 317 to reproduce and display the video data on the display unit 318, this operation will be described such that the reproducing unit 305 reproduces and displays the video data on the display unit 318.

(Color Registration Process)

Figure 4:
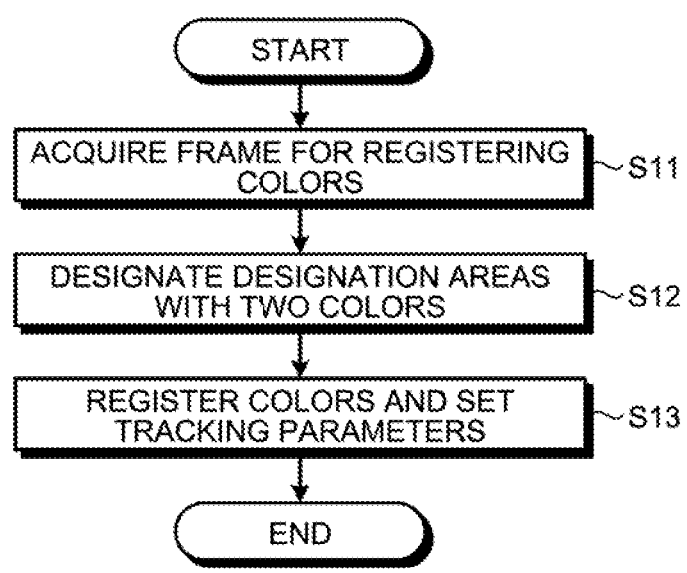
FIG. 4 is a flowchart illustrating an example of the flow of a color registration process performed by the information processing apparatus according to the embodiment.

FIG. 4 is a flowchart illustrating an example of the flow of a color registration process performed by the information processing apparatus according to the embodiment. FIG. 5 is a diagram illustrating an example of a state in which video is displayed on the tracking screen that is displayed on the display unit of the information processing apparatus according to the embodiment. FIG. 6 is a diagram for explaining operation of registering colors of a tracking target in the information processing apparatus according to the embodiment. With reference to FIGS. 4 to 6, the flow of the color registration process performed by the information processing apparatus 3 according to the present embodiment will be described.

First, a configuration of the tracking screen 400 will be described with reference to FIG. 5 for explaining the flow of the color registration process. The tracking screen 400 is a screen for registering a color as feature data through the color registration process, and for performing the tracking process on a specific tracking target that is reproduced and displayed on the video display part 401. The tracking screen 400 includes, as illustrated in FIG. 5, the video display part 401 (display area), a camera selection tab 401a, a video operation button unit 403, a seekbar 404, a slider 405, an enlargement/reduction button unit 406, a span change button unit 407, a time display part 408, a tracking start button 409, and a tracking stop button 410.

The video display part 401 is a display unit on which video data, which is acquired from the storage unit 304 by the reproducing unit 305, is reproduced and displayed in accordance with an operation signal given from the input unit 302 operated by a user. In the example in FIG. 5, if the user performs operation of selecting "2" in the camera selection tab 401a by operating the input unit 302, the storage unit 304 reproduces and displays the video data captured by the imaging apparatus 2b on the video display part 401.

The camera selection tab 401a is an operating unit that allows a user to select video data that the user desires to reproduce and display on the video display part 401 from among pieces of video data of the imaging apparatuses 2a to 2f. For example, the pieces of video data captured by the imaging apparatuses 2a to 2f are respectively associated with "1" to "6". In the example in FIG. 5, a case is illustrated in which "2", i.e., the video data of the imaging apparatus 2b, is selected.

The video operation button unit 403 is a set of buttons for performing replay, quick-rewind, fast-forward, stop, and pause for video data on the video display part 401 in accordance with operation of the input unit 302 performed by the user. The seekbar 404 is a bar-shaped object, in which a position of the slider 405 arranged on the seekbar 404 indicates a time of the video data being reproduced and displayed on the video display part 401. The slider 405 is an object and an operating unit that slides to a certain position on the seekbar 404 in accordance with an imaging time of the video data being reproduced and displayed on the video display part 401 (a time at which the frame being displayed is captured). Conversely, if a user slides the slider 405 by operating the input unit 302, the reproducing unit 305 displays, on the video display part 401, a frame of video data with an imaging time corresponding to the position of the slider 405 on the seekbar 404.

The enlargement/reduction button unit 406 is a set of buttons for causing the reproducing unit 305 to enlarge or reduce the video data being reproduced and displayed on the video display part 401 in accordance with operation of the input unit 302 performed by the user. For example, every time an enlargement button in the enlargement/reduction button unit 406 is pressed, the video data is enlarged at a predetermined enlargement ratio. For example, assuming that a normal display state is 100%, the video data is enlarged by 120%, 140%, . . . .

The span change button unit 407 is a set of buttons for causing the reproducing unit 305 to enlarge or reduce a display span of the seekbar 404 in accordance with operation of the input unit 302 performed by the user. It is not necessary to cause the reproducing unit 305 to enlarge or reduce the display span of the seekbar 404, but it may be possible to cause a different functional unit to perform this operation.

The time display part 408 is a display area for displaying an imaging date and an imaging time of the video data that is being reproduced and displayed on the video display part 401 by the reproducing unit 305.

The tracking start button 409 is a button that, upon being pressed through operation of the input unit 302 performed by the user, causes the managing unit 316 to start a tracking process on a tracking target that is identified by the reference color in the video data being reproduced and displayed on the video display part 401. The tracking stop button 410 is a button that, upon being pressed through operation of the input unit 302 performed by the user, causes the managing unit 316 to stop the tracking process being performed on the tracking target that is identified by the reference color in the video data being reproduced and displayed on the video display part 401.

Next, a detailed flow of the color registration process will be described. The tracking screen 400 illustrated in FIG. 5 indicates a state in which the reproducing unit 305 is reproducing and displaying video data corresponding to the imaging apparatus 2b.

<Step S11>

First, when a pause button in the video operation button unit 403 is pressed through operation of the input unit 302 performed by the user at a timing at which a part of an image desired to be subjected to the color registration process is displayed while video data is being reproduced and displayed on the video display part 401, the reproducing unit 305 pauses reproduction and display of the video data on the video display part 401. As illustrated in FIG. 5, a worker 500 appears in the frame of the paused video data. Then, the acquiring unit 306 acquires the frame being displayed on the video display part 401 from the paused video data. Then, the process proceeds to Step S12.

<Step S12>

Figure 6:
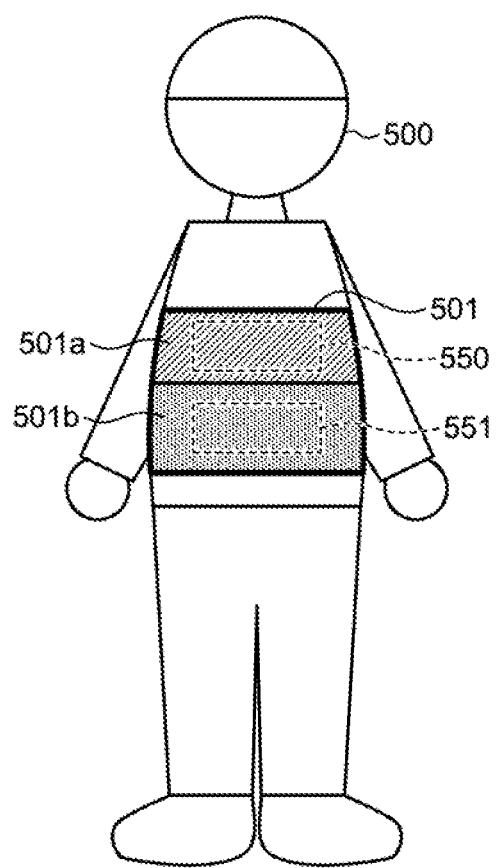
FIG. 6 is a diagram for explaining operation of registering colors of a tracking target in the information processing apparatus according to the embodiment.

Here, it is assumed that a target to be tracked by the information processing apparatus 3 according to the present embodiment in the frame being displayed on the video display part 401 is a tracking target 501 of the worker 500 as illustrated in FIG. 6. The tracking target 501 is a part of an outerwear worn by the worker 500, and includes a first color portion 501a having a specific color and a second color portion 501b having a color different from the first color portion 501a.

Through operation of the input unit 302 performed by the user (for example, drag operation using the mouse 108), the designating unit 307 designates the first designation area 550 in the first color portion 501a and designates the second designation area 551 in the second color portion 501b in order to identify colors that serve as feature data to be used in the tracking process on the tracking target in the frame acquired by the acquiring unit 306, i.e., in the frame displayed on the video display part 401, as illustrated in FIG. 6. That is, the designating unit 307 designates the first designation area 550 and the second designation area 551 having two different colors.

The designating unit 307 may be enabled to designate the designation areas in a state in which the frame displayed on the video display part 401 is enlarged or reduced by the enlargement button or the reduction button of the enlargement/reduction button unit 406. Then, the process proceeds to Step S13.

<Step S13>

The registering unit 308 identifies two reference colors (a reference color corresponding to the first designation area 550 will be referred to as a first color and a reference color corresponding to the second designation area 551 is referred to as a second color) based on the first designation area 550 and the second designation area 551 designated by the designating unit 307, and stores (registers) information on the two identified reference colors in the storage unit 304. Specifically, the registering unit 308 calculates an average value of pixel values of pixels included in each of the designation areas, and identifies the average value as the reference color, for example.

Then, the setting unit 303 sets information indicating a predetermined range centered at the reference color registered by the registering unit 308 as a tracking parameter, and stores the tracking parameters in the storage unit 304. By setting the tracking parameter, a reference color range is determined.

Through Steps S11 to S13 as described above, the color registration process (designation and registration of the reference colors) and setting of the tracking parameters are performed.

(Operation of Detecting Feature Area)

Figure 7:
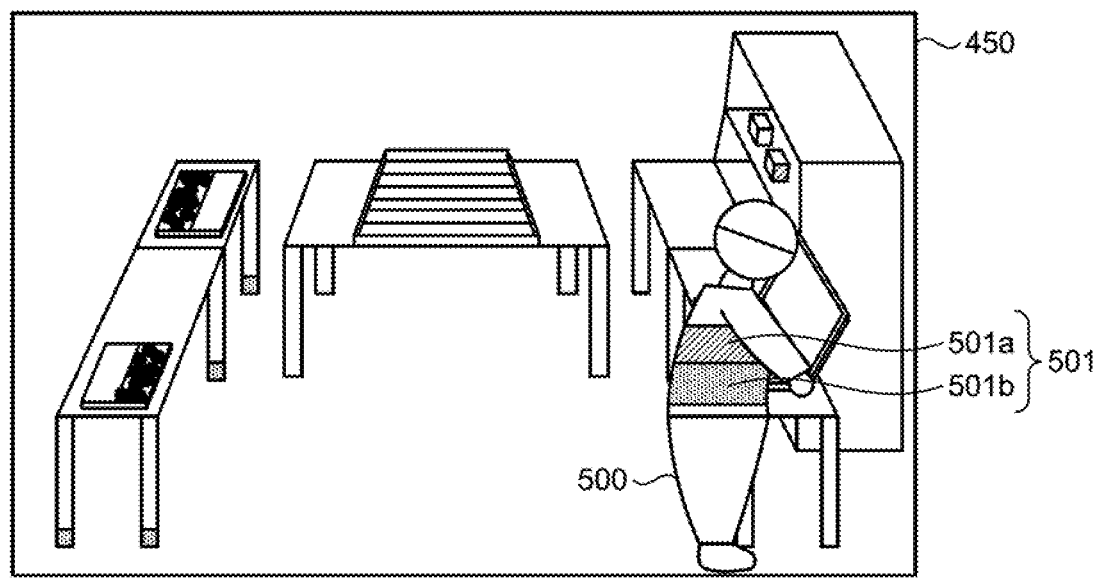
FIG. 7 is a diagram illustrating an example of a frame, which is for detecting a tracking target and which is displayed on the display unit of the information processing apparatus according to the embodiment.
Figure 8:
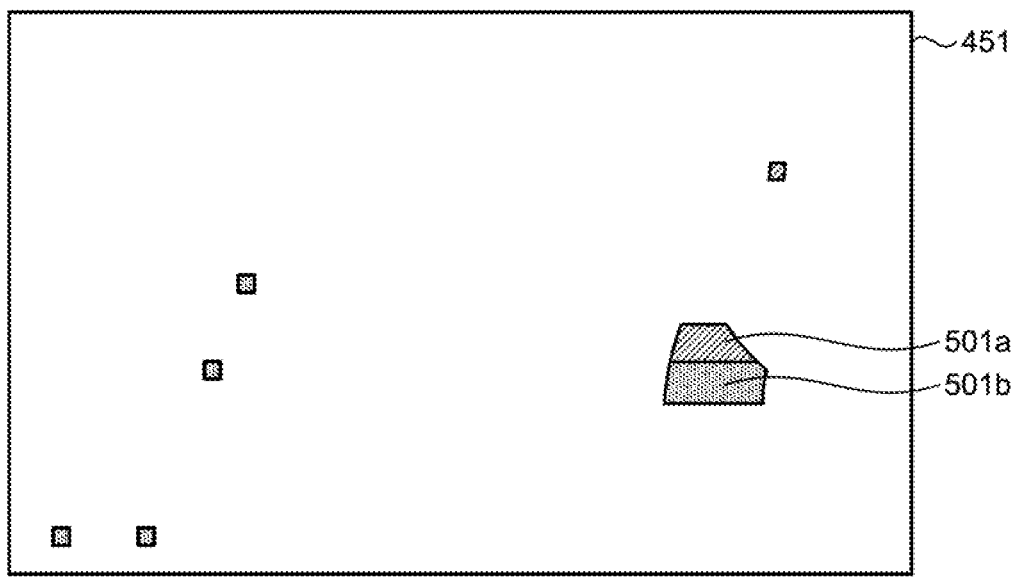
FIG. 8 is a diagram illustrating an example of an extracted image, in which areas with colors that are registered for the frame displayed on the display unit of the information processing apparatus according to the embodiment are extracted.
Figure 9:
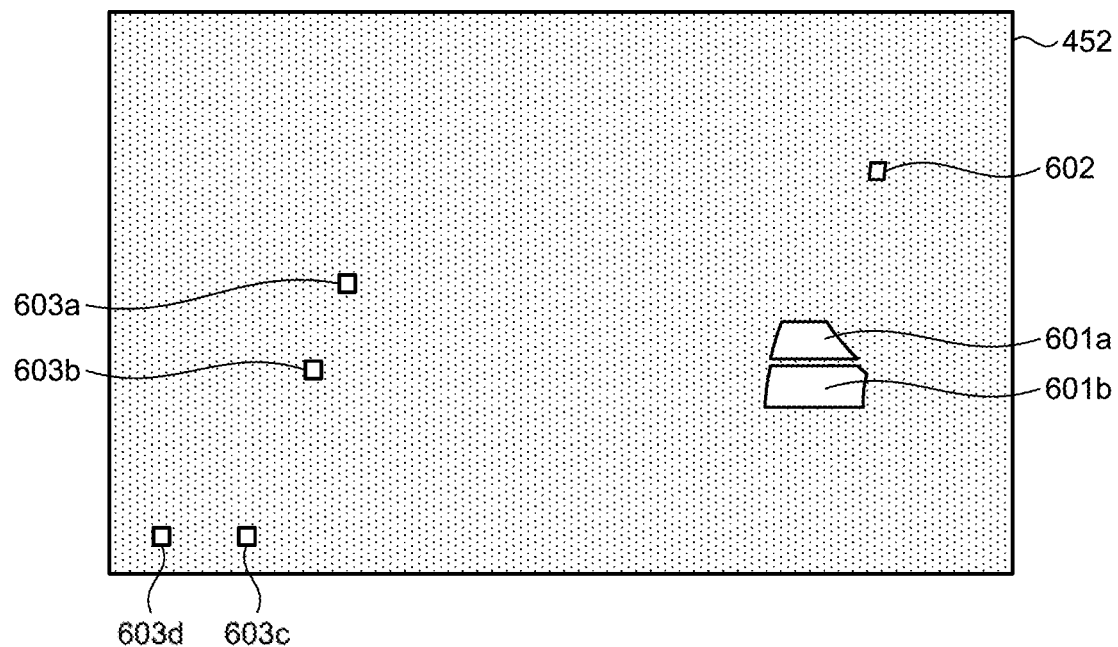
FIG. 9 is a diagram illustrating an example of a binary image, which is obtained by binarizing the extracted image for the frame displayed on the display unit of the information processing apparatus according to the embodiment.
Figure 10:
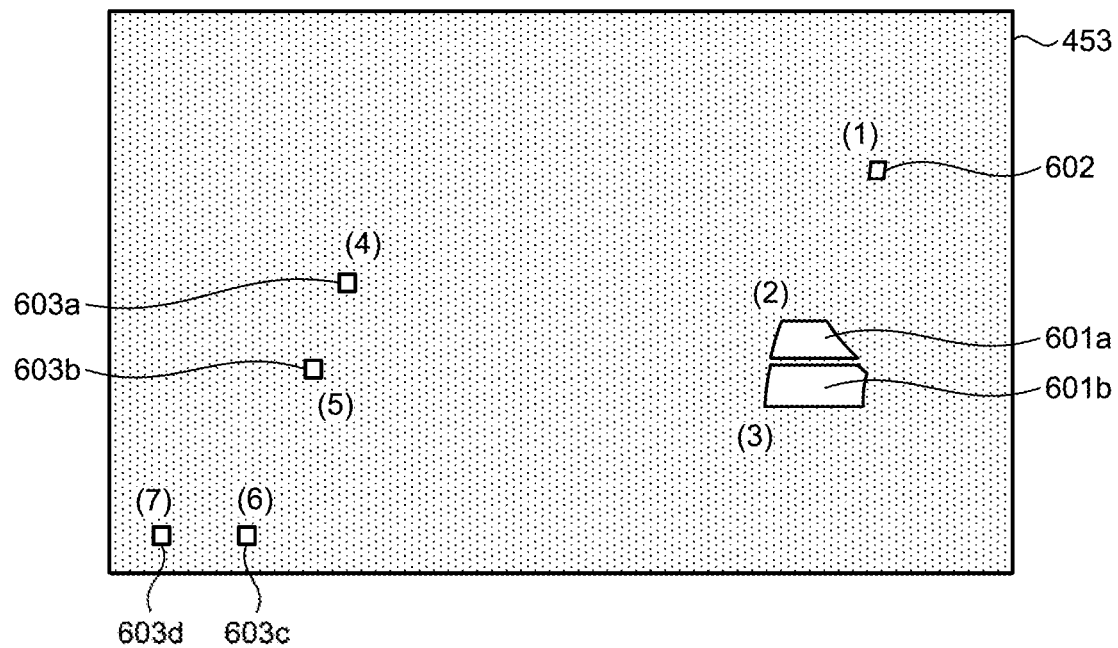
FIG. 10 is a diagram illustrating an example of a labelling image, which is obtained by performing a labelling process on each of blocks of the binary image for the frame displayed on the display unit of the information processing apparatus according to the embodiment.
Figure 11:
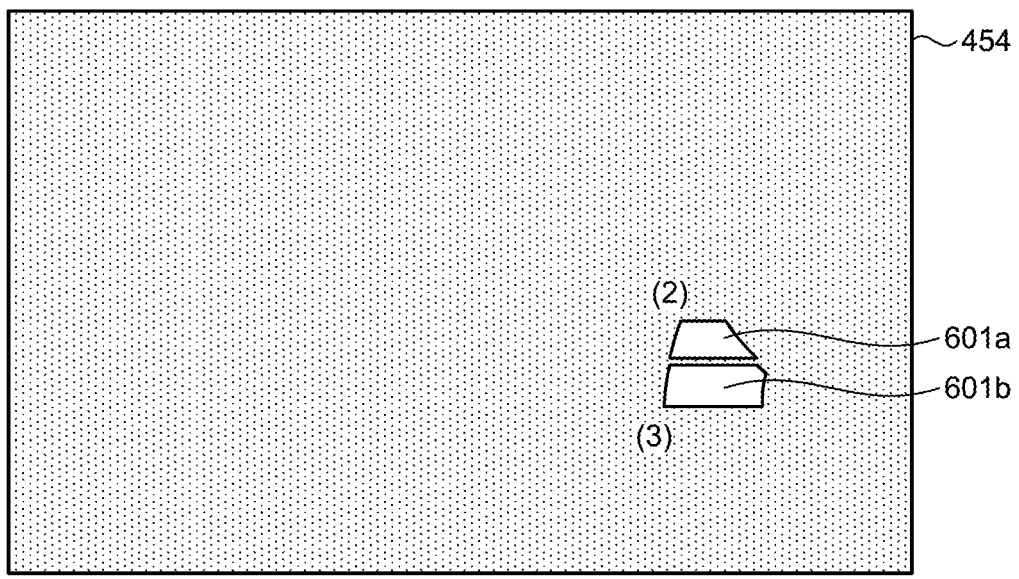
FIG. 11 is a diagram illustrating an example of a target identified image, in which only a specific block is left for the frame displayed on the display unit of the information processing apparatus according to the embodiment.
Figure 12:
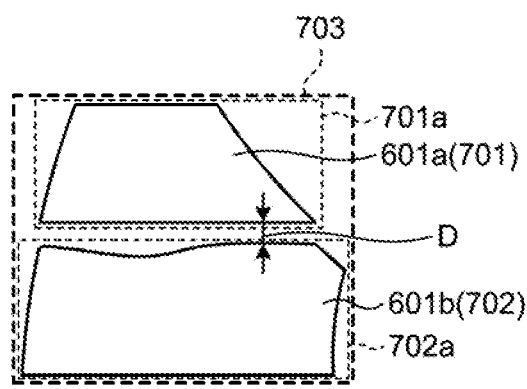
FIG. 12 is a diagram for explaining two feature areas detected from the target identified image and a distance between the feature areas for the frame displayed on the display unit of the information processing apparatus according to the embodiment.
Figure 13:
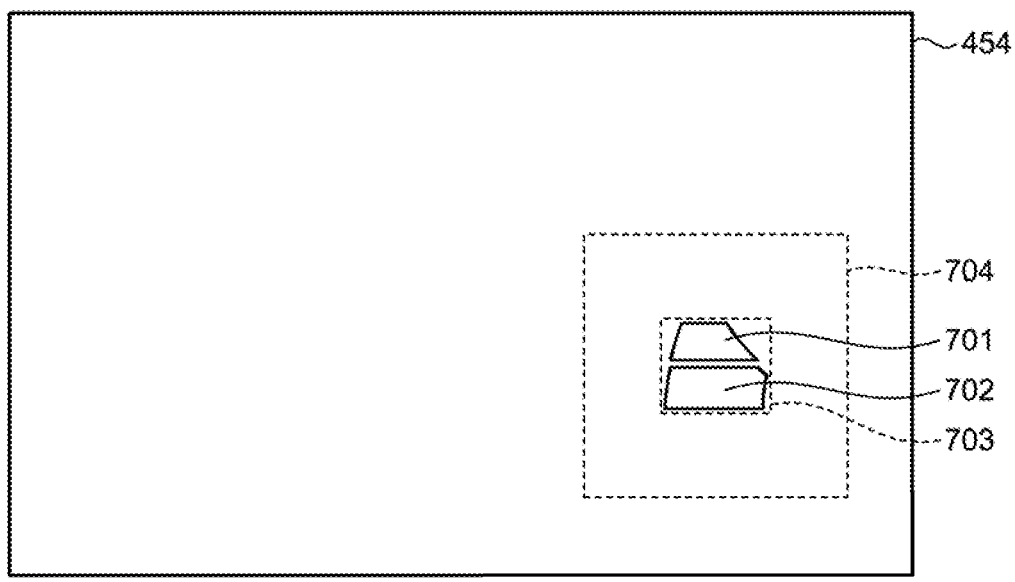
FIG. 13 is a diagram for explaining operation of determining a search area in the target identified image for the frame displayed on the display unit of the information processing apparatus according to the embodiment.

FIG. 7 is a diagram illustrating an example of a frame, which is for detecting a tracking target and which is displayed on the display unit of the information processing apparatus according to the embodiment. FIG. 8 is a diagram illustrating an example of an extracted image, in which areas with colors that are registered for the frame displayed on the display unit of the information processing apparatus according to the embodiment are extracted. FIG. 9 is a diagram illustrating an example of a binary image, which is obtained by binarizing the extracted image for the frame displayed on the display unit of the information processing apparatus according to the embodiment. FIG. 10 is a diagram illustrating an example of a labelling image, which is obtained by performing a labelling process on each of blocks of the binary image for the frame displayed on the display unit of the information processing apparatus according to the embodiment. FIG. 11 is a diagram illustrating an example of a target identified image, in which only a specific block is left for the frame displayed on the display unit of the information processing apparatus according to the embodiment. FIG. 12 is a diagram for explaining two feature areas detected from the target identified image and a distance between the feature areas for the frame displayed on the display unit of the information processing apparatus according to the embodiment. FIG. 13 is a diagram for explaining operation of determining a search area in the target identified image for the frame displayed on the display unit of the information processing apparatus according to the embodiment. With reference to FIG. 7 to 13, operation of detecting a feature area by the detecting unit 310 of the information processing apparatus 3 according to the present embodiment will be described.

It is assumed that an original image 450 illustrated in FIG. 7 is displayed on the video display part 401 of the tracking screen 400. In the original image 450, the worker 500 with the tracking target 501 including the first color portion 501a and the second color portion 501b appears. In the following, an example of operation of detecting the tracking target 501 will be described by taking the original image 450 as an example.

First, the detecting unit 310 acquires an extracted image 451 (first image) illustrated in FIG. 8 through an extraction process (first process) for extracting only pixels whose pixel values are included in the two kinds of reference color ranges from among pixels of the original image 450. Further, as illustrated in FIG. 8, pixels corresponding to the first color portion 501a and the second color portion 501b, in which the designation areas are designated to identify the two reference colors, are extracted by the extraction process. Furthermore, the original image 450 may include an object with a color close to the reference colors identified by the registering unit 308, and pixels with the color close to the reference colors, i.e., pixels whose pixel values are included in the reference color ranges, may be extracted by the extraction process.

Subsequently, the detecting unit 310 performs a binarization process (second process) on the extracted image 451 obtained by the extraction process, and obtains a binary image 452 (second image) illustrated in FIG. 9. Here, as the binarization process, the pixels extracted by the extraction process are replaced with pixels with a white color and all of pixels other than the extracted pixels are replaced with pixels with a black color, for example. The binarization process is not limited to the process as described above, and it may be possible to perform binarization using other methods such that pixels having pixel values equal to or greater than a predetermined threshold are replaced with pixels with a white color and pixels having pixel values smaller than the threshold are replaced with pixels with a black color. The binary image 452 illustrated in FIG. 9, which is obtained by performing the binarization process on the extracted image 451, includes seven blocks, such as blocks 601a, 601b, 602, and 603a to 603d, as blocks, each of which is an aggregation of pixels with a white color.

Subsequently, the detecting unit 310 performs a labelling process (third process) on the binary image 452 obtained by the binarization process, and obtains a labelling image 453 (third image) illustrated in FIG. 10. Here, the labelling process is a process of assigning identification information for distinguishing each of the blocks (aggregations of pixels of a white color) obtained by the binarization process. As the labelling process, pixel values of pixels included in each of the blocks in the binary image 452 are replaced with a value that uniquely identifies the subject block, for example. For example, in the example of the labelling image 453 illustrated in FIG. 10, the detecting unit 310 replaces the pixel values of the pixels included in the block 602 with "1", replaces the pixel values of the pixels included in the block 601a with "2", and replaces the pixel values of the pixels included in the block 601b with "3". Further, the detecting unit 310 replaces the pixel values of the pixels included in the blocks 603a to 603d with "4" to "7", respectively. Accordingly, each of the blocks is uniquely distinguished.

Subsequently, the detecting unit 310 performs a process of deleting a block whose area is smaller than a predetermined area, with respect to each of the blocks included in the labelling image 453 obtained by the labelling process, and obtains a target identified image 454 illustrated in FIG. 11. As a result of this process, the detecting unit 310 deletes the blocks 602 and 603a to 603d whose areas are smaller than the predetermined area, and maintains the blocks 601a and 601b whose areas are equal to or greater than the predetermined area.

Subsequently, the detecting unit 310 detects, as feature areas, areas that include pixels with colors within the two kinds of reference color ranges (predetermined color ranges) and that have pixels corresponding to the blocks of the target identified image 454, in the search area that is determined by the search area determining unit 309 in the original image 450 that is a frame to be subjected to the tracking process by the tracking target 501. Here, if the original image 450 is the first frame to be subjected to the tracking process, the search area determining unit 309 determines the whole original image 450 as the search area. As illustrated in FIG. 12, the detecting unit 310 detects a feature area 701, which includes pixels within the reference color range for the first color and which have pixels corresponding to the block 601a of the original image 450, as a result of the operation of detecting the feature area in the search area. Further, the detecting unit 310 detects a feature area 702, which includes pixels within the reference color range for the second color and which have pixels corresponding to the block 601b.

Subsequently, the distance calculating unit 311 calculates a distance between the feature area 701 and the feature area 702 detected by the detecting unit 310. Specifically, as illustrated in FIG. 12, the distance calculating unit 311 calculates a distance D between the most adjacent pixels among the pixels included in each of the feature area 701 and the feature area 702.

Subsequently, the determining unit 312 determines whether the distance D between the feature area 701 and the feature area 702 calculated by the distance calculating unit 311 is equal to or smaller than a predetermined threshold. If the determining unit 312 determines that the distance D is greater than the predetermined threshold, the updating unit 313 determines that the feature area 701 and the feature area 702 are not located adjacent to each other, and determines that a tracking area including the tracking target 501 is not detectable. In contrast, if the determining unit 312 determines that the distance D is equal to or smaller than the predetermined threshold, the updating unit 313 determines that the feature area 701 and the feature area 702 are located adjacent to each other. In this case, the updating unit 313 designates a rectangular feature area frame 701a in which the feature area 701 is inscribed and a rectangular feature area frame 702a in which the feature area 702 is inscribed, and detects a minimum rectangular area, in which both of the feature area frame 701a and the feature area frame 702a are inscribed, as a tracking area 703 including the tracking target 501. That is, the updating unit 313 updates a tracking area with the detected tracking area 703 as an area including the current tracking target 501 (the tracking target 501 included in the frame displayed on the video display part 401). Further, the updating unit 313 stores, in the storage unit 304, information on the detected tracking area 703 in association with the detected frame (the original image 450).

Then, as illustrated in FIG. 13, the search area determining unit 309 determines an area with a predetermined size centered at the center of the tracking area 703 detected by the updating unit 313, as a search area 704 for detecting the tracking target 501 in a frame next to the original image 450. The search area 704 illustrated in FIG. 13 is set as a rectangular area, but is not limited thereto, and may be set to an area of a different shape, such as a circular shape or an elliptical shape.

(Tracking Process on Tracking Target)

Figure 14:
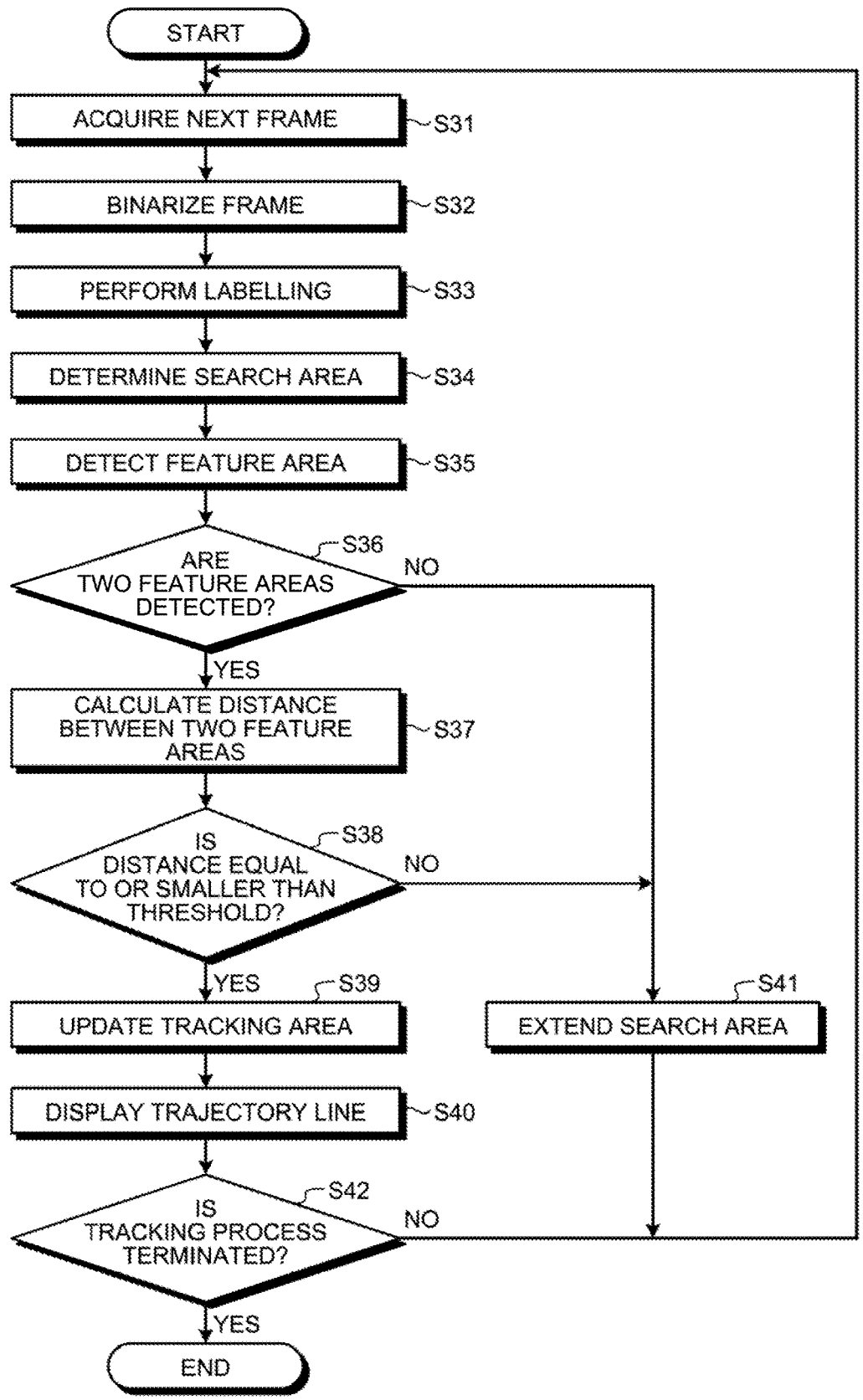
FIG. 14 is a flowchart illustrating an example of the flow of a tracking process on a tracking target, which is performed by the information processing apparatus according to the embodiment.
Figure 16:
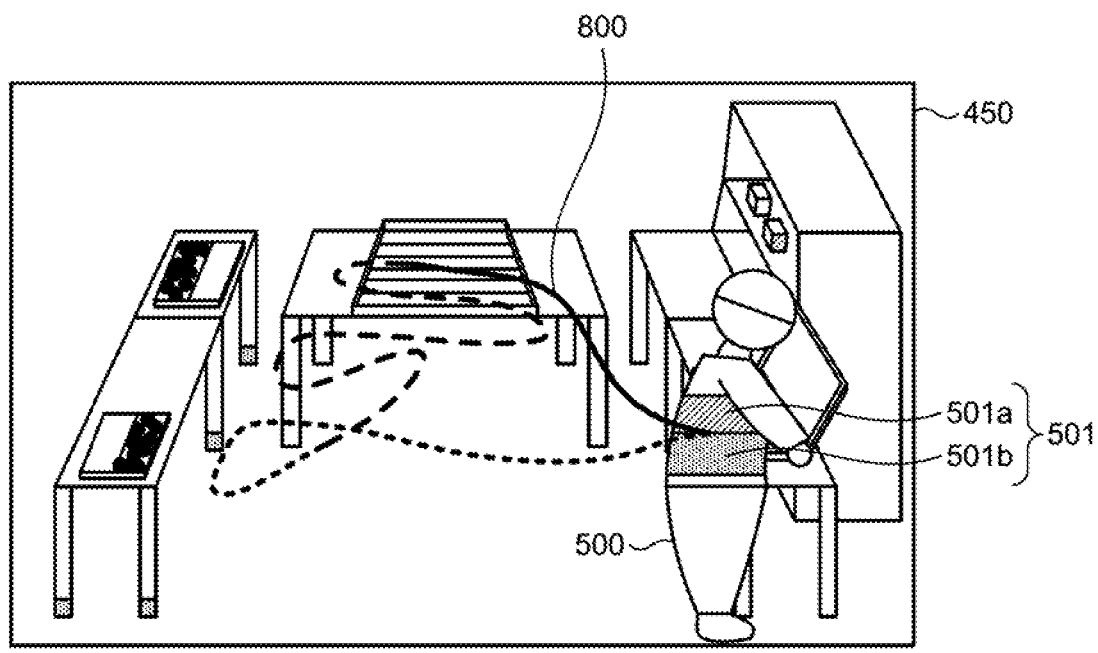
FIG. 16 is a diagram illustrating an example of a state in which a trajectory line is superimposed on video displayed on the display unit of the information processing apparatus according to the embodiment.
Figure 17:
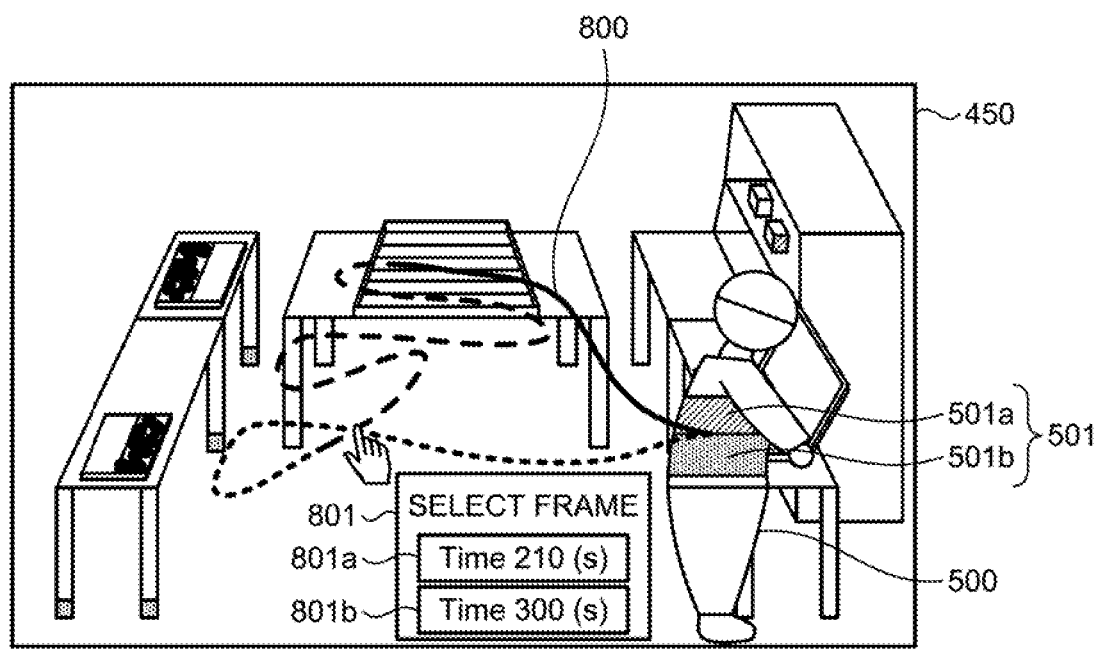
FIG. 17 is a diagram for explaining operation that is performed when the trajectory line displayed on the display unit of the information processing apparatus according to the embodiment is selected.

FIG. 14 is a flowchart illustrating an example of the flow of a tracking process on a tracking target, which is performed by the information processing apparatus according to the embodiment. FIG. 15 is a diagram illustrating an example of a tracking result table indicating information on a tracking area detected through the tracking process performed by the information processing apparatus according to the embodiment. FIG. 16 is a diagram illustrating an example of a state in which a trajectory line is superimposed on video displayed on the display unit of the information processing apparatus according to the embodiment. FIG. 17 is a diagram for explaining operation that is performed when the trajectory line displayed on the display unit of the information processing apparatus according to the embodiment is selected. With reference to FIGS. 14 to 17, the flow of the tracking process on the tracking target performed by the information processing apparatus 3 according to the present embodiment will be described. It is assumed that the two reference colors (the first color and the second color) are registered through the above-described color registration process in advance. First, when a user presses the tracking start button 409 by operating the input unit 302 at a timing at which a frame desired to be subjected to the tracking process on the tracking target (for example, the tracking target 501 illustrated in FIG. 16) is displayed while the reproducing unit 305 is reproducing and displaying video data on the video display part 401, the managing unit 316 starts the tracking process on the tracking target from the frame displayed by the reproducing unit 305. The video data reproduced and displayed on the video display part 401 by the reproducing unit 305 may be real-time video data received from the imaging apparatus 2, or may be past video data stored in the storage unit 304.

<Step S31>

The acquiring unit 306 acquires a frame that is displayed by the reproducing unit 305 at a timing immediately after the tracking start button 409 is pressed or a frame that is provided next to a frame, for which the tracking process is terminated, and that is displayed by the reproducing unit 305. The frame acquired by the acquiring unit 306 is not limited to the frame provided next to the frame for which the tracking process is terminated, but may be a frame provided after a lapse of a predetermined time. That is, the tracking process is not necessarily performed for each frame after the frame of video data for which the process is started, but may be performed on frames at predetermined time intervals. Hereinafter, the frame acquired by the acquiring unit 306 may be referred to as a "target frame" (first frame). Then, the process proceeds to Step S32.

<Step S32>

The detecting unit 310 acquires an extracted image (for example, the extracted image 451 illustrated in FIG. 8) through the extraction process of extracting only pixels whose pixel values are included in the reference color ranges of the first color and the second color from among pixels of the target frame. Then, the detecting unit 310 performs the binarization process on the extracted image obtained by the extraction process, and obtains a binary image (for example, the binary image 452 illustrated in FIG. 9). The binary image includes blocks, which are aggregations of pixels of a white color, as in the binary image 452 illustrated in FIG. 9, for example. Then, the process proceeds to Step S33.

<Step S33>

The detecting unit 310 performs the labelling process on the binary image obtained by the binarization process, and obtains a labelling image (for example, the labelling image 453 illustrated in FIG. 10). In the labelling process, for example, the pixel values of the pixels included in each of the blocks in the binary image 452 are replaced with a value that uniquely identifies the subject block. Accordingly, each of the blocks is uniquely distinguished.

Subsequently, the detecting unit 310 performs the process of deleting a block whose area is smaller than a predetermined area, with respect to each of the blocks included in the labelling image obtained by the labelling process, and obtains a target identified image (for example, the target identified image 454 illustrated in FIG. 11). This process is performed to delete small blocks and eliminate blocks that appear not to correspond to the tracking target from targets for the detection operation in advance. Then, the process proceeds to Step S34.

<Step S34>

The search area determining unit 309 determines a range, which has a predetermined size and which is centered at the center of a tracking area that is detected by the updating unit 313 in a frame (an example of a second frame) provided before the target frame at Step S39 to be described later, as a search area in the target frame. If the target frame is the first frame to be subjected to the tracking process, the search area determining unit 309 determines the whole target frame as the search area. The search area determined by the search area determining unit 309 is not limited to the area centered at the center of the tracking area that is detected in the frame provided before the target frame, but an area including at least a tracking area that is detected in the previous frame may be determined as the search area. Then, the process proceeds to Step S35.

<Step S35>

The detecting unit 310 identifies an area, which includes pixels within the reference color range for the first color and which have pixels corresponding to a block of the target identified image, in the search area of the target frame determined by the search area determining unit 309, and detects the identified area as a feature area (hereinafter, may be referred to as a "first feature area") (for example, the feature area 701 illustrated in FIG. 12). Further, the detecting unit 310 identifies an area, which includes pixels within the reference color range for the second color and which have pixels corresponding to a block of the target identified image, in the search area, and detects the identified area as a feature area (hereinafter, may be referred to as a "second feature area") (for example, the feature area 702 illustrated in FIG. 12). Then, the process proceeds to Step S36.

<Step S36>

At Step S35, if the detecting unit 310 detects the two feature areas (the first feature area and the second feature area) (YES at Step S36), the process proceeds to Step S37. If at least one of the first feature area and the second feature area is not detected (NO at Step S36), the process proceeds to Step S41.

<Step S37>

The distance calculating unit 311 calculates a distance between the first feature area and the second feature area detected by the detecting unit 310. Specifically, the distance calculating unit 311 calculates a distance (for example, the distance D illustrated in FIG. 12) between the most adjacent pixels among the pixels included in each of the first feature area and the second feature area. Then, the process proceeds to Step S38.

<Step S38>

The determining unit 312 determines whether the distance between the first feature area and the second feature area calculated by the distance calculating unit 311 is equal to or smaller than a predetermined threshold. If the determining unit 312 determines that the distance is greater than the predetermined threshold (NO at Step S38), the updating unit 313 determines that the first feature area and the second feature area are not located adjacent to each other, determines that a tracking area including the tracking target is not detectable, and proceeds to Step S41. In contrast, if the determining unit 312 determines that the distance is equal to or smaller than the predetermined threshold (YES at Step S38), the updating unit 313 determines that the first feature area and the second feature area are located adjacent to each other, and proceeds to Step S39.

<Step S39>

The updating unit 313 designates a rectangular feature area frame in which the first feature area is inscribed (hereinafter, referred to as a "first feature area frame") (for example, the feature area frame 701a illustrated in FIG. 12), and designates a rectangular feature area frame in which the second feature area is inscribed (hereinafter, referred to as a "second feature area frame") (for example, the feature area frame 702a illustrated in FIG. 12). Then, the updating unit 313 detects a minimum rectangular area, in which both of the first feature area frame and the second feature area frame are inscribed, as a tracking area including the tracking target (for example, the tracking area 703 illustrated in FIG. 12). That is, the updating unit 313 updates a tracking area with the detected tracking area as an area including the current tracking target (the tracking target included in the target frame). Further, the updating unit 313 stores, in the storage unit 304, information on the detected tracking area in association with the target frame. For example, as in a tracking result table 1000 illustrated in FIG. 15, the updating unit 313 stores, in the storage unit 304, information in which the central coordinates of the tracking area, a frame number, and an elapsed time since start of the tracking process are associated among pieces of information on the tracking area. The tracking result table 1000 is described as information in a table format, but is not limited thereto, and may be information of any format as long as the central coordinates of the tracking area, the frame number, and the elapsed time are associated in the information. Then, the process proceeds to Step S40.

<Step S40>

The trajectory generating unit 315 reads, from the tracking result table 1000 stored in the storage unit 304, the central coordinates of the tracking area corresponding to the target frame and the central coordinates of the tracking area corresponding to the frame provided before the target frame. Then, the trajectory generating unit 315 generates a trajectory line that connects the center point of the tracking area corresponding to the target frame and the center point of the tracking area corresponding to the frame provided before the target frame, and displays the trajectory line in a superimposed manner on the target frame displayed on the video display part 401. In this case, the trajectory generating unit 315 similarly displays trajectory lines that are generated for frames starting from a frame provided after the start of the tracking process to the frame provided before the target frame, in a superimposed manner on the target frame. With this operation, the trajectory lines indicating a trajectory of the tracking target after the start of the tracking process are displayed in a superimposed manner on the video data on the video display part 401.

Further, the moving amount calculating unit 314 reads, from the tracking result table 1000 stored in the storage unit 304, the central coordinates of the tracking area corresponding to the target frame and the central coordinates of the tracking area corresponding to the frame provided before the target frame. Then, the moving amount calculating unit 314 calculates a distance (moving amount) between the central coordinates of the tracking area corresponding to the target frame and the central coordinates of the tracking area corresponding to the frame provided before the target frame, and adds the moving amount to a moving amount that is calculated for the frames starting from the frame provided after the start of the tracking process to the frame provided before the target frame. That is, the moving amount calculated by the moving amount calculating unit 314 is equal to the length of the trajectory line generated by the trajectory generating unit 315.

The trajectory generating unit 315 may display, as the trajectory line superimposed on the target frame (the original image 450) displayed on the video display part 401, a trajectory line 800 in which a line type is changed in chronological order as illustrated in FIG. 16. In the example illustrated in FIG. 16, the oldest trajectory is represented by a bold line, the latest trajectory is represented by a dotted line, and the middle trajectory is represented by a dashed line in the trajectory line 800. With this configuration, it is possible to visually recognize which part of the trajectory is new or old when the trajectory line of the tracking target is viewed, and this is useful in analyzing operation of the tracking target based on the trajectory line. The trajectory line 800 illustrated in FIG. 16 is displayed such that the line type is changed in chronological order, but is not limited to this example, and parts of the trajectory line may be displayed in different modes in chronological order such that a color of the trajectory line is changed in chronological order or points of different shapes are plotted in chronological order.

Then, the process proceeds to Step S42.

<Step S41>

The search area determining unit 309 determines that the detecting unit 310 has not detected the tracking area in the search area of the target frame, that is, the tracking target is lost, extends the search area, and uses the search area in the tracking process on a frame provided next to the target frame (an example of the third frame). Examples of the method of extending the search area include a method of extending the search area in a horizontal axis direction and a vertical axis direction by a predetermined amount and a method of extending the area of the search area by a predetermined ratio while maintaining a similar figure (with the same center). Accordingly, it becomes possible to easily detect the tracking target again in the tracking process on the frame next to the target frame. Then, the process returns to Step S31.

<Step S42>

The managing unit 316 determines whether the tracking stop button 410 is pressed through operation of the input unit 302 performed by the user. If the tracking stop button 410 is pressed, the managing unit 316 terminates the tracking process (YES at Step S42). In contrast, if the tracking stop button 410 is not pressed, the managing unit 316 maintains the tracking process (NO at Step S42), and returns to Step S31.

Through Steps S31 to S42 as described above, the tracking process on the tracking target is performed.

When any part of the trajectory line displayed in a superimposed manner on the video data displayed on the video display part 401 is selected through operation of the input unit 302 performed by the user (for example, click operation using the mouse 108), the reproducing unit 305 may reproduce and display the frame with the date and time corresponding to the operated part of the trajectory line. In this case, if a part at which lines intersect with each other is operated as in the trajectory line 800 illustrated in FIG. 17, the reproducing unit 305 may display a frame selection window 801 and allows the user to select any of frames with dates and times corresponding to the intersecting lines as illustrated in FIG. 17, for example. In the example illustrated in FIG. 17, the frame selection window 801 includes a selection button 801a denoted as "Time 210(s)" and a selection button 801b denoted as "Time 300(s)", where the times indicate times from the start of the tracking process. In this case, a part displayed with the dashed line corresponds to the selection button 801*a* and a part displayed with the dotted line corresponds to the selection button 801*b* in the intersecting lines of the trajectory line 800. For example, if the selection button 801*a* is pressed through operation of the input unit 302 performed by the user, the reproducing unit 305 reproduces and displays a frame provided after a lapse of 210 seconds since the start of the tracking process. The reproducing unit 305 may start reproduction and display when a replay button of the video operation button unit 403 is pressed through operation of the input unit 302 performed by the user when the frame is displayed in a paused state, instead of performing reproduction and display from the frame with the date and time corresponding to the operated part of the trajectory line.

Further, in the flow of the tracking process illustrated in FIG. 14, the extraction process, the binarization process, and the labelling process are performed on the whole target frame, but the embodiments are not limited to this example. The detecting unit 310 may perform at least any of the extraction process, the binarization process, and the labelling process on the search area determined by the search area determining unit 309. With this operation, it is possible to reduce load on the tracking process on the tracking target.

(Examples of Application of Tracking Process on Tracking Target)

Next, examples of application of the above-described tracking process on the tracking target will be described.

Figure 18A:
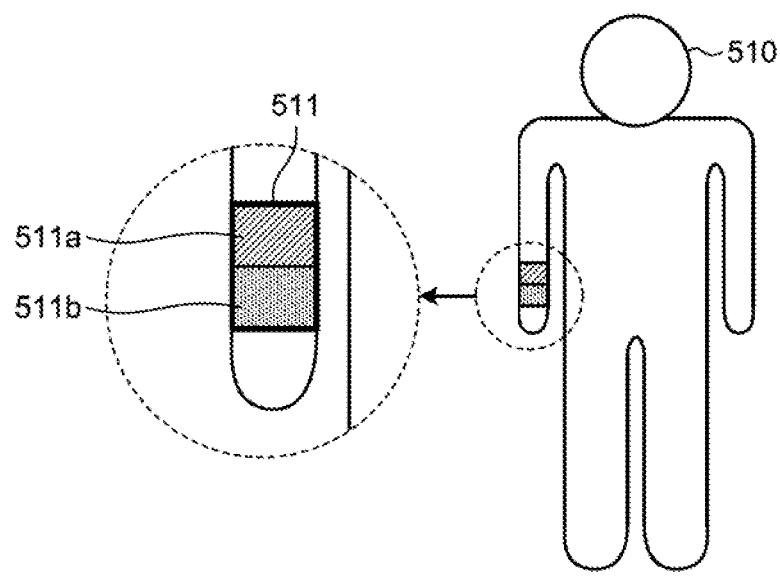
FIGS. 18A and 18B are diagrams for explaining an example in which a two-color wristband worn by a worker is employed as a tracking target.
Figure 18B:
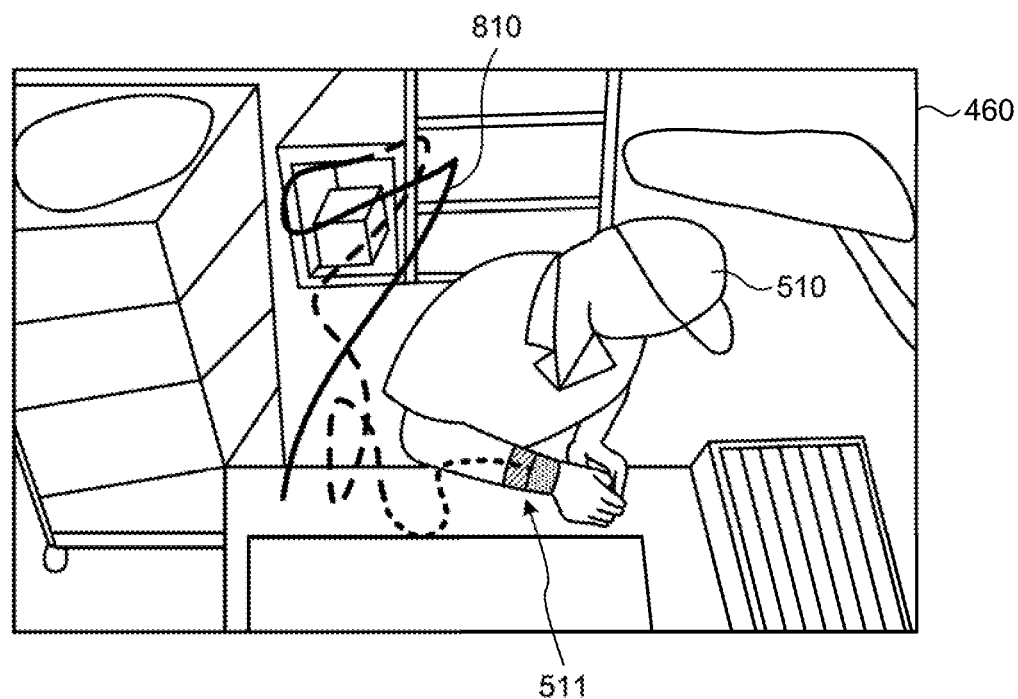

FIGS. 18A and 18B are diagrams for explaining an example in which a two-color wristband worn by a worker is employed as a tracking target. In the example illustrated in FIGS. 18A and 18B, a tracking target 511, which is a wristband worn on the arm of a worker 510 who performs operation of assembling parts or the like, is employed as a target for the tracking process in the frame displayed on the video display part 401 as illustrated in FIG. 18A. The tracking target 511 includes a first color portion 511*a* with a specific color and a second color portion 511*b* with a color different from the first color portion 511*a*.

In this manner, by employing the two-color wristband (the tracking target 511) worn by the worker 510 as the tracking target, it is possible to recognize a behavior of the wristband as indicated by a trajectory line 810 in a trajectory superimposed image 460 illustrated in FIG. 18B, so that it is possible to analyze work efficiency of the worker 510, or the like.

Figure 19:
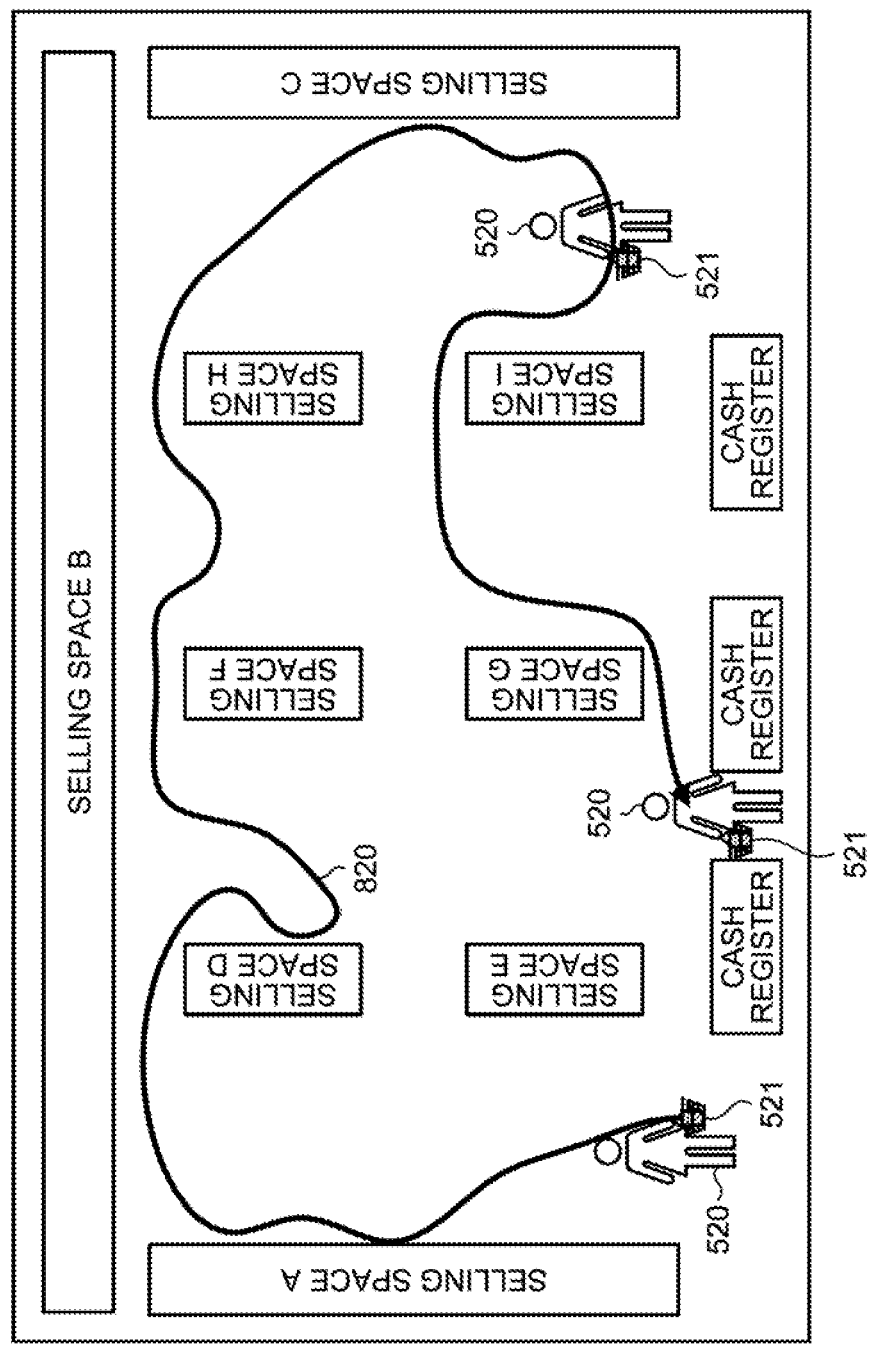
FIG. 19 is a diagram for explaining an example in which a two-color sheet attached to a basket carried by a shopper is employed as a tracking target.

FIG. 19 is a diagram for explaining an example in which a two-color sheet attached to a basket carried by a shopper is employed as a tracking target. In the example illustrated in FIG. 19, a tracking target 521, which is a two-color sheet attached to a basket carried by a shopper 520 in a supermarket in which selling spaces A to I are provided, is employed as a target for the tracking process in the frame displayed on the video display part 401.

In this manner, by employing the two-color sheet (the tracking target 521) attached to the basket carried by the shopper 520 as the tracking target, it is possible to recognize a behavior of the shopper 520 as indicated by a trajectory line 820 illustrated in FIG. 19, so that it is possible to analyze a preference of the shopper 520 with respect to products displayed in the supermarket, and improve product layouts, for example.

Figure 20:
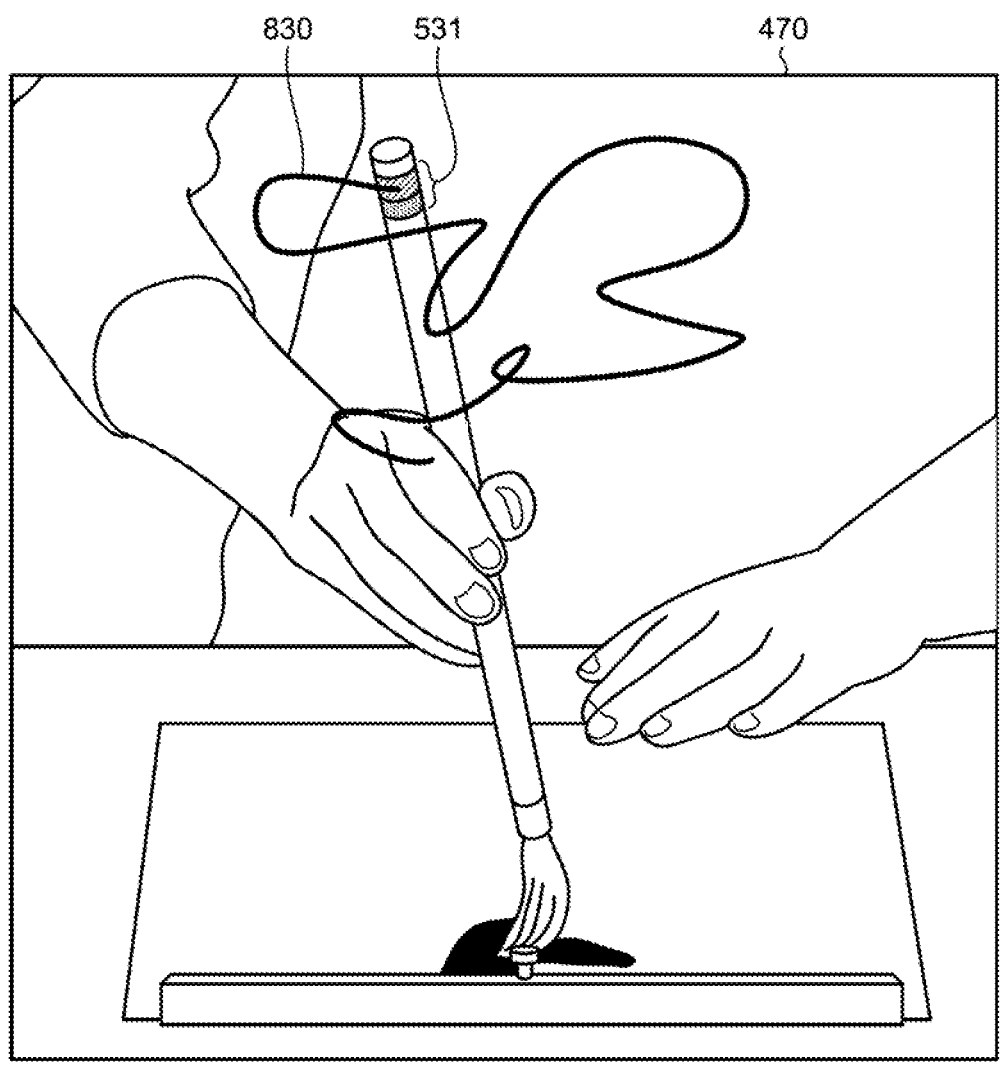
FIG. 20 is a diagram for explaining an example in which a two-color seal attached to a calligraphy brush is employed as a tracking target.

FIG. 20 is a diagram for explaining an example in which a two-color seal attached to a calligraphy brush is employed as a tracking target. In the example illustrated in FIG. 20, a tracking target 531, which is a two-color seal attached to a calligraphy brush, is employed as a target for the tracking process in the frame displayed on the video display part 401.

In this manner, by employing the two-color seal (the tracking target 531) attached to the calligraphy brush as the tracking target, it is possible to recognize a movement of the calligraphy brush as indicated by a trajectory line 830 in a trajectory superimposed image 470 illustrated in FIG. 20, and this may be used to improve a calligraphy technique by comparison with a movement of a brush held by an expert.

As described above, two colors (the first color and the second color) among colors included in the tracking target are registered in advance as the feature data, and when the detecting unit 310 detects an area including any one of the two colors in a frame as a feature area and the determining unit 312 determines that the feature area including the first color and the feature area including the second color are located adjacent to each other, the updating unit 313 detects the feature areas as tracking areas including a tracking target. In this manner, areas including the two colors of the tracking target are detected, so that even when a single area having any one of the two colors is present in the periphery, it is possible to prevent this area from being erroneously detected as the tracking area, so that it is possible to improve detection accuracy of the tracking target.

Further, the search area determining unit 309 determines the search area and the detecting unit 310 performs a process of detecting the tracking target in the search area. Therefore, it is possible to reduce load on the process and prevent a similar area in an unnaturally separated portion from being detected as the feature area.

Furthermore, when the detecting unit 310 does not detect the tracking area in the search area of the target frame (when the tracking target is lost), the search area determining unit 309 extends the search area and uses the extended search area in the tracking process on a frame provided next to the target frame. Therefore, it becomes possible to easily detect the tracking target again in the tracking process on the frame next to the target frame.

Moreover, the trajectory generating unit 315 displays a trajectory line indicating a trajectory of the tracking target in a superimposed manner on the video data being reproduced and displayed. Therefore, it is possible to visually recognize the trajectory of the tracking target, and this is useful in analyzing operation of the tracking target.

In the above-described tracking process on the tracking target, it is explained that the detecting unit 310 detects a feature area in each of the frames based on the reference color that is registered in advance by the registering unit 308, but the embodiments are not limited to this example. For example, when detecting a feature area in a specific frame, the detecting unit 310 may update the reference color based on a color of a pixel included in the feature area, and detect a feature area in a next frame based on the updated reference color. With this configuration, it is possible to easily detect a feature area even when an environment around the tracking target has changed (for example, when lighting conditions have changed, or the like).

Furthermore, in the above-described tracking process on the tracking target, the trajectory generating unit 315 displays the trajectory line in a superimposed manner using the tracking area that is detected in real time by the updating unit 313, with respect to the video data being reproduced and displayed by the reproducing unit 305, but the embodiments are not limited to this example. That is, when the tracking result table 1000 stored in the storage unit 304 is available in the tracking process on the tracking target, and when the reproducing unit 305 reproduces and displays corresponding video data again, the trajectory generating unit 315 may refer to the central coordinates of the tracking area in the tracking result table 1000 stored in the storage unit 304, and display the trajectory line of the tracking target in a superimposed manner on the video data by using the referred central coordinates.

Moreover, it is explained that the registering unit 308 registers two reference colors as the feature data based on two designation areas designated by the designating unit 307, but the embodiments are not limited to this example, and it may be possible to register three or more reference colors. In this case, if three reference colors are registered, the detecting unit 310 detects three kinds of feature areas based on the three reference colors. Then, for example, the distance calculating unit 311 calculates a distance between the three kinds of feature areas, the determining unit 312 performs threshold determination based on the distances, and the updating unit 313 detects and updates, as the tracking area, an area including the three kinds of feature areas when all of the distances are equal to or smaller than the threshold.

Furthermore, in the above-described example, it is explained that the two different reference colors are registered, but the embodiments are not limited to this example. That is, when a single reference color is registered, and if it is determined that a distance between two detected feature areas (that is, feature areas having the same color) is short, it is possible to determine the areas as the tracking areas.

Moreover, in the above-described tracking process on the tracking target, the detecting unit 310 performs the process of deleting a block whose area is smaller than a predetermined area in the labelling image, but it may be possible not to perform this process. With this configuration, it becomes possible to easily perform the tracking process on a tracking target whose area is small in the frame.

First Modification

Figure 21:
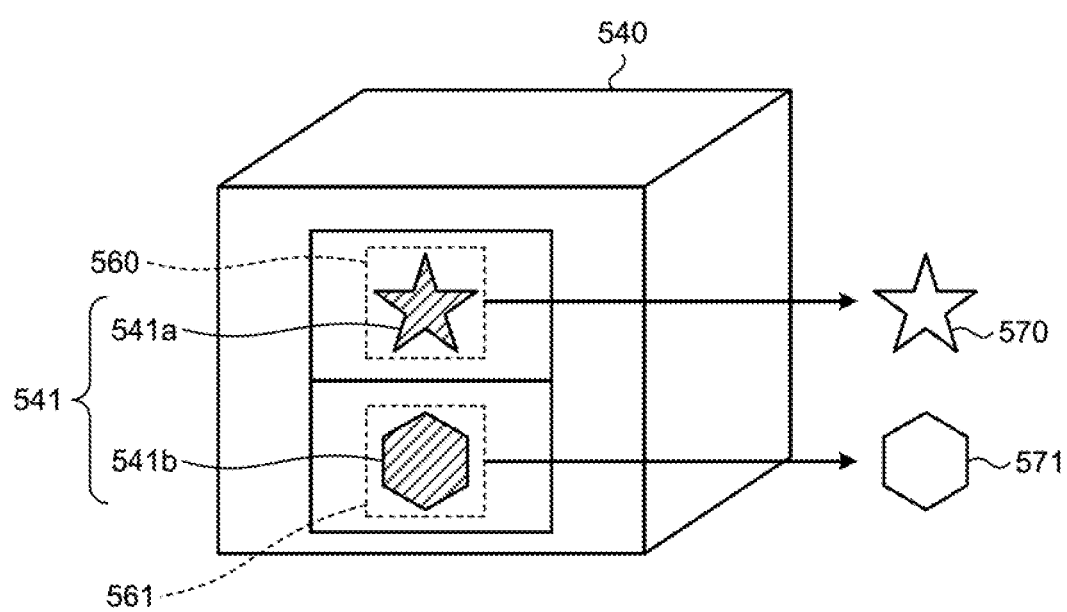
FIG. 21 is a diagram for explaining operation of registering shapes of a tracking target in an information processing apparatus according to a first modification of the embodiment.

With reference to FIG. 21, an information processing apparatus 3 according to a first modification will be described below; in particular, a difference from the information processing apparatus 3 according to the embodiment described above will be mainly described. In the embodiment described above, operation has been described in which a color is employed as the feature data, the registering unit 308 designates two reference colors based on two designation areas, and a tracking target is detected using the two reference colors. In the first modification, operation will be described in which a shape is employed as the feature data, the registering unit 308 designates two shapes included in two respective designation areas as reference shapes, and a tracking target is detected using the two reference shapes. A configuration of an image processing system 1 and a hardware configuration and a functional block configuration of the information processing apparatus 3 according to the first modification are the same as those of the embodiment described above.

FIG. 21 is a diagram for explaining operation of registering shapes of a tracking target in the information processing apparatus according to the first modification of the embodiment. First, a process of registering shapes in the first modification will be described below with reference to FIG. 21.

It is assumed that the information processing apparatus 3 of the first modification employs a tracking target 541 of a box 540 as a tracking target in a frame displayed on the video display part 401 as illustrated in FIG. 21. The tracking target 541 is a seal or the like attached to a lateral surface of the box 540, and includes a first shape portion 541*a* having a specific shape and a second shape portion 541*b* having a shape different from the first shape portion 541*a*.

Through operation of the input unit 302 performed by the user (for example, drag operation using the mouse 108), the designating unit 307 designates a first designation area 560 in the first shape portion 541*a* and designates a second designation area 561 in the second shape portion 541*b* in order to identify shapes that serve as feature data to be used in the tracking process on the tracking target in the frame acquired by the acquiring unit 306, i.e., in the frame displayed on the video display part 401, as illustrated in FIG. 21. That is, the designating unit 307 designates the first designation area 560 and the second designation area 561 having two different shapes.

The registering unit 308 identifies two reference shapes (a reference shape corresponding to the first designation area 560 is referred to as a first shape and a reference shape corresponding to the second designation area 561 is referred to as a second shape) based on the first designation area 560 and the second designation area designated by the designating unit 307, and stores (registers) information on the two identified reference shapes in the storage unit 304. Specifically, the registering unit 308 performs image processing, such as edge detection, in each of the designation areas for example, and identifies a first extracted shape 570 (first shape) for the first shape portion 541*a* and a second extracted shape 571 (second shape) for the second shape portion 541*b*.

Then, the setting unit 303 sets a template for the reference shape registered by the registering unit 308 as a tracking parameter, and stores the set tracking parameter in the storage unit 304. Through the process as described above, the process of registering the shapes (identification and registration of the reference shapes) and setting of the tracking parameters are performed.

Next, with reference to FIG. 21, the tracking process on the tracking target according to the first modification will be described. In the tracking process of the first modification, the process performed after two feature areas are detected (the processes from Steps S36 to S42 in the example in FIG. 14) are the same as those of the tracking process of the embodiment described above; therefore, operation of detecting the feature areas will be described below.

The acquiring unit 306 acquires a frame that is displayed by the reproducing unit 305 at a timing immediately after the tracking start button 409 is pressed or a frame that is provided next to a frame, for which the tracking process is terminated, and that is displayed by the reproducing unit 305. Hereinafter, the frame acquired by the acquiring unit 306 may be referred to as a "target frame".

Subsequently, as the process corresponding to Step S39 illustrated in FIG. 14, the search area determining unit 309 determines a range, which has a predetermined size and which is centered at the center of a tracking area that is detected by the updating unit 313 in a frame provided before the target frame, as a search area in the target frame. If the target frame is the first frame to be subjected to the tracking process, the search area determining unit 309 determines the whole target frame as the search area.

Subsequently, the detecting unit 310 performs template matching using a template of the reference shape registered by the registering unit 308 in the search area that is determined by the search area determining unit 309 in the target frame. Specifically, the detecting unit 310 performs template matching using a template for the first shape in the search area of the target frame, and detects the matched area as a first feature area. Further, the detecting unit 310 performs template matching using a template for the second shape in the search area of the target frame, and detects the matched area as a second feature area.

The other processes in the tracking process on the tracking target are the same as the processes from Steps S36 to S42 illustrated in FIG. 14 as described above.

As described above, two shapes (the first shape and the second shape) among shapes included in the tracking target are registered in advance as the feature data instead of the colors used as features in the embodiment described above, and, when the detecting unit 310 detects an area including any one of the two shapes in the frame as a feature area and the determining unit 312 determines that the feature area including the first shape and the feature area including the second shape are located adjacent to each other, the updating unit 313 detects the feature areas as tracking areas including a tracking target. In this manner, areas including the two shapes of the tracking target are detected, so that even when a single area having any of the two shapes is present in the periphery, it is possible to prevent this area from being erroneously detected as the tracking area, so that it is possible to improve detection accuracy of the tracking target.

In the explanation of FIG. 21 described above, it is assumed that two different shapes are registered, but the embodiments are not limited to this example. That is, even when the two shapes are the same, if it is determined that a distance between two detected feature areas (that is, feature areas having the same shape) is short, it is possible to determine the areas as the tracking areas.

Further, while the color is employed as the feature data in the embodiment described above and the shape is employed as the feature data in the first modification, it is possible to use the color and the shape in combination. In this case, if a distance between a feature area detected based on the reference color and a feature area detected based on the reference shape is short, it is possible to determine that an area including the feature areas serves as a tracking area.

Second Modification

Figure 22:
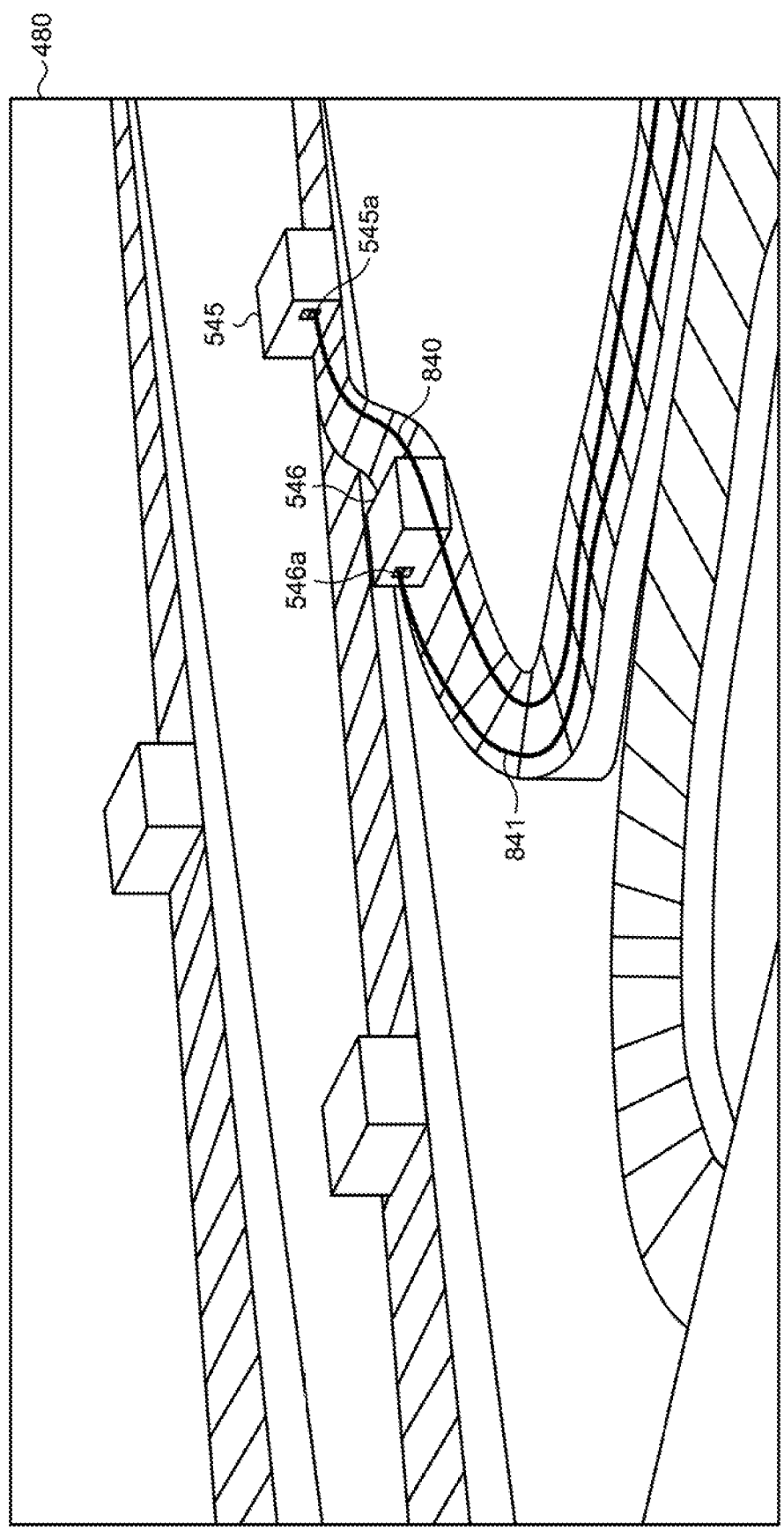
FIG. 22 is a diagram for explaining a tracking process on a plurality of tracking targets, which is performed by an information processing apparatus according to a second modification of the embodiment.

With reference to FIG. 22, an information processing apparatus 3 according to a second modification will be described below, where a difference from the information processing apparatus 3 according to the embodiment described above will be mainly described. In the embodiment described above, operation of tracking a single tracking target in a target frame has been described. In the second modification, operation of tracking a plurality of tracking targets in a target frame will be described. A configuration of an image processing system 1 and a hardware configuration and a functional block configuration of the information processing apparatus 3 according to the second modification are the same as those of the embodiment described above.

FIG. 22 is a diagram for explaining a tracking process on a plurality of tracking targets, which is performed by the information processing apparatus according to the second modification of the embodiment. With reference to FIG. 22, operation of tracking a plurality of tracking targets in a target frame of the second modification will be described. In FIG. 22, a state is illustrated in which boxes are automatically conveyed in a distribution warehouse.

Operation performed by the registering unit 308 for identifying two reference colors based on two designation areas designated by the designating unit 307, and storing (registering) information on the two identified reference colors in the storage unit 304 is the same as that of the embodiment described above.

In FIG. 7 to FIG. 13 described above, operation of detecting feature areas for a single tracking target has been described, and this operation can be directly applied to a plurality of tracking targets. In this case, when the detecting unit 310 detects a plurality of combinations of two feature areas for the first color and the second color, it is sufficient to cause the distance calculating unit 311 to calculate a distance, cause the determining unit 312 to perform threshold determination on the distance, and cause the updating unit 313 to detect and update a tracking area for each of the combinations. Further, when the updating unit 313 detects a tracking area including a plurality of tracking targets, it is sufficient to cause the search area determining unit 309 to determine an area, which has a predetermined size and which is centered at the center of each of the tracking areas, as a search area for detecting the same tracking target in a frame next to the target frame. If it is difficult to determine a portion in which a plurality of tracking targets may appear in a frame or if a plurality of tracking targets may appear all over the frame, it may be possible not to cause the search area determining unit 309 to determine a specific search area but to perform operation of searching a feature area in the whole frame.

A trajectory superimposed image 480 illustrated in FIG. 22 is an image which is obtained when a plurality of tracking targets (products 545 and 546) appear in a frame and in which a result of the tracking process on the plurality of tracking targets is reflected. The products 545 and 546 have respective tracking targets (tracking targets 545a and 546a) having the same two colors. With respect to the tracking targets 545a and 546a, the detecting unit 310 detects feature areas, the distance calculating unit 311 calculates a distance, the determining unit 312 performs threshold determination on the distance, and the updating unit 313 detects and updates a tracking area. Here, the updating unit 313 stores the tracking result table 1000 (see FIG. 15) corresponding to each of the tracking targets 545a and 546a in the storage unit 304. Then, the trajectory generating unit 315 reads the central coordinates of the tracking area corresponding to the target frame and the central coordinates of the tracking area corresponding to a frame provided before the target frame, from each of the two different tracking result tables 1000 stored in the storage unit 304. Then, the trajectory generating unit 315 generates two trajectory lines connecting the center points of the tracking areas corresponding to the target frame and the center points of the tracking areas corresponding to the frame provided before the target frame, and displays the trajectory lines in a superimposed manner on the target frame displayed on the video display part 401. In this case, the trajectory generating unit 315 displays the two trajectory lines that are generated for frames starting from the frame provided after the start of the tracking process to the frame provided before the target frame, in a superimposed manner on the target frame. With this operation, two trajectory lines (trajectory lines 840 and 841) indicating trajectories of the tracking targets after the start of the tracking process are displayed in a superimposed manner on the video data on the video display part 401. The trajectory lines 840 and 841 are lines indicating trajectories of the tracking targets 545a and 546a, respectively.

As described above, even when a plurality of tracking targets are present, an area including two colors is detected for each of the tracking targets. Therefore, similarly to the embodiment described above, even when a single area having any one of the two colors is present in the periphery, it is possible to prevent this area from being erroneously detected as the tracking area, so that it is possible to improve detection accuracy of the tracking target. In the example illustrated in FIG. 22, it is possible to track each of the boxes in the process of automatically conveying the boxes in the distribution warehouse, so that it is possible to detect delay in the conveyance.

In the tracking process on a plurality of tracking targets, it is explained that the registering unit 308 registers two colors (the first color and the second color), but the embodiments are not limited to this example. For example, it is not necessary to register one set of colors (the first color and the second color), but it may be possible to register two or more sets of colors and detect feature areas having the respective sets of colors, which makes it possible to detect tracking targets having the respective sets of colors.

When at least any of the functional units such as the setting unit 303, the reproducing unit 305, the acquiring unit 306, the designating unit 307, the registering unit 308, the search area determining unit 309, the detecting unit 310, the distance calculating unit 311, the determining unit 312, the updating unit 313, the moving amount calculating unit 314, the trajectory generating unit 315, the managing unit 316, and the display control unit 317 of the embodiment and each of the modifications is realized by execution of a program, the program is provided by being incorporated in a ROM or the like in advance. Further, the program executed by the information processing apparatus 3 of the embodiment and each of the modifications may be provided by being recorded in a computer-readable recording medium, such as a compact disk read only memory (CD-ROM), a flexible disk (FD), a compact disk recordable (CD-R), or a DVD, in a computer-installable or computer-executable file format. Furthermore, the program executed by the information processing apparatus 3 of the embodiment and each of the modifications may be stored in a computer connected to a network, such as the Internet, and may be provided by being downloaded via the network. Moreover, the program executed by the information processing apparatus 3 of the embodiment and each of the modifications may be configured so as to be provided or downloaded via a network, such as the Internet. Furthermore, the program executed by the information processing apparatus 3 of the embodiment and each of the modifications has a module structure including at least any one of the functional units described above. As actual hardware, a CPU reads the program from the ROM described above and executes the program, so that each of the units described above is loaded and generated on a main storage device.

REFERENCE SIGNS LIST

1 Image processing system
2, 2a to 2f Imaging apparatus
3 Information processing apparatus
4 Network
10 External apparatus
101 CPU
102 ROM
103 RAM
104 External storage device
105 Display
106 Network I/F
107 Keyboard
108 Mouse
109 DVD drive
110 DVD
111 External apparatus I/F
113 Bus
301 Video receiving unit
302 Input unit
303 Setting unit
304 Storage unit
305 Reproducing unit
306 Acquiring unit
307 Designating unit
308 Registering unit
309 Search area determining unit
310 Detecting unit
311 Distance calculating unit
312 Determining unit
313 Updating unit
314 Moving amount calculating unit
315 Trajectory generating unit
316 Managing unit
317 Display control unit
318 Display unit
400 Tracking screen
401 Video display part
401a Camera selection tab
403 Video operation button unit
404 Seekbar
405 Slider
406 Enlargement/reduction button unit
407 Span change button unit
408 Time display part
409 Tracking start button
410 Tracking stop button
450 Original image
451 Extracted image
452 Binary image
453 Labelling image
454 Target identified image
460 Trajectory superimposed image
470 Trajectory superimposed image
480 Trajectory superimposed image
500 Worker
501 Tracking target
501a First color portion
501b Second color portion
510 Worker
511 Tracking target
511a First color portion
511b Second color portion
520 Shopper
521 Tracking target
531 Tracking target
540 Box
541 Tracking target
541a First shape portion
541b Second shape portion
545 Product
545a Tracking target
546 Product
546a Tracking target
550 First designation area
551 Second designation area
560 First designation area
561 Second designation area
570 First extracted shape
571 Second extracted shape
601a, 601b, 602, 603a to 603d Block
701, 702 Feature area 701*a*, 702*a* Feature area frame
703 Tracking area
704 Search area
800 Trajectory line
801 Frame selection window
801*a*, 801*b* Selection button
810 Trajectory line
820 Trajectory line
830 Trajectory line
840, 841 Trajectory line
1000 Tracking result table

The invention claimed is:

1. An image processing apparatus, comprising:
processing circuitry configured to
reproduce and cause display video data captured by an imaging apparatus to be displayed in a predetermined display area on a display;
register a reference color corresponding to a color included in a tracking target as feature information;
detect a plurality of two-dimensional feature areas, based on the feature information that is registered in advance for detecting the tracking target, in a first frame of the displayed video data; and
determine an area that encompasses the plurality of two-dimensional feature areas as a tracking area that includes the tracking target, based on a distance between pixels in the detected plurality of two-dimensional feature areas,
wherein the processing circuitry is further configured to
obtain a first image by extracting an area including a pixel with a color that is included in a predetermined color range that includes the reference color in at least a partial area of the first frame,
obtain a second image by binarizing the first image,
obtain a third image in which one or more blocks that are obtained in the second image through the binarizing are distinguished from one another, and
when a pixel value of an area of the first frame corresponding to each of the blocks of the third image is included in the predetermined color range, detect the area as the feature area.

2. The image processing apparatus according to claim 1, wherein the processing circuitry is further configured to:
calculate the distance,
determine whether the calculated distance is equal to or smaller than a threshold, and
when determining that the distance between the plurality of two-dimensional feature areas is equal to or smaller than the threshold, determine the area encompassing the plurality of two-dimensional feature areas as the tracking area.

3. The image processing apparatus according to claim 1, wherein the processing circuitry is further configured to:
determine a specific area, which is to be a target in which the processing circuitry is configured to detect the plurality of two-dimensional feature areas, as a search area in the display area, and
detect the plurality of two-dimensional feature areas in the search area.

4. The image processing apparatus according to claim 3, wherein the processing circuitry is further configured to determine a first area, which has a predetermined size and which includes the determined tracking area in a second frame provided before the first frame, as the search area in the first frame.

5. The image processing apparatus according to claim 3, wherein
when the processing circuitry does not detect the tracking area in the first frame, the processing circuitry is further configured to determine a new search area by extending the search area determined for the first frame by a predetermined amount, and
the processing circuitry is further configured to detect the plurality of two-dimensional feature areas in the new search area for a third frame provided after the first frame.

6. The image processing apparatus according to claim 1, wherein the processing circuitry is further configured to register a plurality of reference colors corresponding to a plurality of colors included in the tracking target as the feature information.

7. The image processing apparatus according to claim 1, wherein the processing circuitry is further configured to:
designate a designation area for registering the reference color; and
register the reference color using a color of a pixel present in the designation area.

8. The image processing apparatus according to claim 1, wherein the processing circuitry is further configured to additionally register a reference shape corresponding to a shape included in the tracking target as the feature information.

9. The image processing apparatus according to claim 8, wherein the processing circuitry is further configured to:
designate a designation area for registering the reference shape; and
register the reference shape using a shape present in the designation area.

10. The image processing apparatus according to claim 1, wherein the processing circuitry is further configured to cause the display to display a trajectory line indicating a trajectory of the tracking target in a superimposed manner on the video data.

11. The image processing apparatus according to claim 10, wherein the processing circuitry is further configured to cause the display to display parts of the trajectory line in different modes in chronological order.

12. The image processing apparatus according to claim 1, wherein the processing circuitry is further configured to update the feature information with new feature information based on the plurality of feature areas detected in the first frame, and detect a plurality of feature areas based on the new feature information in a frame provided after the first frame.

13. An image processing system comprising:
the imaging apparatus configured to capture the video data;
the display device configured to display the video data captured by the imaging apparatus; and
the image processing apparatus according to claim 1.

14. An image processing method, comprising:
reproducing and displaying video data captured by an imaging apparatus in a predetermined display area on a display;
registering a reference color corresponding to a color included in a tracking target as feature information;
detecting a plurality of two-dimensional feature areas, based on the feature information that is registered in advance for detecting the tracking target, in a first frame of the displayed video data; and
determining an area that encompasses the plurality of two-dimensional feature areas as a tracking area that includes the tracking target, based on a distance between pixels in the detected plurality of two-dimensional feature areas, wherein the method further includes obtaining a first image by extracting an area including a pixel with a color that is included in a predetermined color range that includes the reference color in at least a partial area of the first frame, obtaining a second image by binarizing the first image, obtaining a third image in which one or more blocks that are obtained in the second image through the binarizing are distinguished from one another, and when a pixel value of an area of the first frame corresponding to each of the blocks of the third image is included in the predetermined color range, detecting the area as the feature area.

15. A non-transitory computer-readable recording medium that contains a computer program that causes a computer to execute a method comprising:

reproducing and displaying video data captured by an imaging apparatus in a predetermined display area on a display device;

registering a reference color corresponding to a color included in a tracking target as feature information;

detecting a plurality of two-dimensional feature areas based on the feature information that is registered in advance for the tracking target, in a first frame of the displayed video data; and determining an area that encompasses the plurality of two-dimensional feature areas as a tracking area that includes the tracking target, based on a distance between pixels in the detected plurality of two-dimensional feature areas, wherein the method further includes obtaining a first image by extracting an area including a pixel with a color that is included in a predetermined color range that includes the reference color in at least a partial area of the first frame, obtaining a second image by binarizing the first image, and obtaining a third image in which one or more blocks that are obtained in the second image through the binarizing are distinguished from one another, and when a pixel value of an area of the first frame corresponding to each of the blocks of the third image is included in the predetermined color range, detecting the area as the feature area.

16. The image processing apparatus of claim 1, wherein the processing circuitry is further configured to detect a first feature area and a second feature area, and determine the area that encompasses the first and second feature areas, based on the distance, which is a distance between adjacent-most pixels in the first and second feature areas.

* * * * *